(12) United States Patent
Zitnick et al.

(10) Patent No.: US 7,412,427 B2
(45) Date of Patent: Aug. 12, 2008

(54) OBJECT INSTANCE RECOGNITION USING FEATURE SYMBOL TRIPLETS

(75) Inventors: Charles L. Zitnick, Seattle, WA (US); Jie Sun, Atlanta, GA (US); Richard S. Szeliski, Bellevue, WA (US); Simon A. J. Winder, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 7 days.

(21) Appl. No.: 11/342,218

(22) Filed: Jan. 27, 2006

(65) Prior Publication Data

US 2007/0179921 A1    Aug. 2, 2007

(51) Int. Cl.
*G06E 1/00*   (2006.01)
*G06E 3/00*   (2006.01)
*G06F 15/18*  (2006.01)
*G06G 7/00*   (2006.01)

(52) U.S. Cl. .................................................. 706/20
(58) Field of Classification Search .................... 706/20
See application file for complete search history.

(56) References Cited

U.S. PATENT DOCUMENTS 6,262,742 B1 * 7/2001 Tampieri .................... 345/426
6,975,755 B1 * 12/2005 Baumberg ................... 382/154
2005/0190949 A1 * 9/2005 Weber ........................ 382/100

OTHER PUBLICATIONS

Lee, Three Dimensional Pattern Recognition Using Feature-Based Indexing and Rule-Based Search, Graduate College University of Nevada Las Vegas, Dec. 2003.*

Unsalan et al., Classifying Land Development in High Resolution Satellite Images Using Straight Line Statistics, 1051-4651/02, 2002, IEEE.*

Brown, M., and Lowe, D.G., "Invariant Features from interest point groups" in *British Machine and Vision Conference*, Cardiff, Wales (2002), pp. 656-665.

Fergus, R., Perona, P., Zisserman, A., "Object class recognition by unsupervised scale-invariant learning", in *IEEE Proc. of Computer Vision and Pattern Recognition* (2003), pp. 264-271.

Lamdan, Y., and Wolfson, H. J., "Geometric hashing: A general and efficient model-based recognition scheme" in *Proceedings of the International Conference of Computer Vision* (1988), pp. 238-249.

(Continued)

*Primary Examiner*—Michael B Holmes
(74) *Attorney, Agent, or Firm*—Lyon & Harr, L.L.P.; Craig S. Fischer

(57) ABSTRACT

A feature symbol triplets object instance recognizer and method for recognizing specific objects in a query image. Generally, the recognizer and method find repeatable features in the image, and match the repeatable features between a query image and a set of training images. More specifically, the recognizer and method finds features in the query image and then groups all possible combinations of three features in to feature triplets. Small regions or "patches" in the query image, and an affine transformation is applied to the patches to identify any similarity between patches in a query image and training images. The affine transformation is computed using position of neighboring features in each feature triplet. Next, all similar patches are found, and then pairs of images are aligned to determine if the patches agree in the position of the object. If they do, then it is said that object is found and identified.

20 Claims, 19 Drawing Sheets

OTHER PUBLICATIONS

Lowe, D.G., "Distinctive image features from scale-invariant keypoints", in *Int'l J. of Computer Vision 60* (2004), pp. 91-110.

Lowe, D.G., "Local feature view clustering for 3D object recognition" in *IEEE Proc. of Computer Vision and Pattern Recognition* (2001), pp. 682-688.

Lowe, D.G., "Object recognition from local scale-invariant features", in *IEEE Proc. of Int'l Conf. on Computer Vision* (1999), pp. 1150-1157.

Mikolajczyk, K., Schmid, C., "An affine invariant interest point detector", in *IEEE Proc. of European Conf. on Computer Vision* (2002), pp. 128-142.

Mikolajczyk, K., Schmid, C., "A performance evaluation of local descriptors", in *IEEE Trans. on Pattern Recognition and Machine Intelligence*, Oct. 2005 (vol. 27, No. 10), pp. 1615-1630.

Rothganger, F., Lazebnik, S., Schmid, C., Ponce, J., "Object modeling and recognition using local affine-invariant image descriptors and multi-view spatial constraints", *Int'l Journal of Computer Vision*, To appear—2005, available at: http://lear.inrialpes.fr/pubs/index.php?idAuthor=108.

Schmid, C., Mohr, R., "Local gray value invariants for image retrieval", in *IEEE Trans. on Pattern Recognition and Machine Intelligence* 19 (1997), pp. 530-534.

Sivic, J., Russell, B.C., Efros, A.A., Zisserman, A., Freeman, W.T., "Discovering objects and their location in images", in *IEEE Proc. of Int'l Conf. on Computer Vision*, Oct. 2005.

Viola, P., Jones, M., "Rapid object detection using a boosted cascade of simple features", in *Proc. CVPR.* (2001), pp. 511-518.

Weber, M., Welling, M., Perona, P., "Unsupervised learning of models for recognition", in *IEEE Proc. of European Conf. on Computer Vision* (2000), pp. 18-32.

* cited by examiner

1000

1010

—1600

—1610

OBJECT INSTANCE RECOGNITION USING FEATURE SYMBOL TRIPLETS

BACKGROUND

Object instance (or known object) recognition is the task of recognizing a specific object. Object instance recognition does not recognize categories of objects, but instead a particular object from a category. By way of example, these specific objects may include specific artwork (such as the Mona Lisa), a specific photograph, the front of a restaurant, or an object on a supermarket shelf.

Object instance recognition remains a challenging problem in computer vision. Literally millions of objects exist, and finding a computationally feasible method for recognizing a particular object can be difficult. Some of the most promising approaches to object instance recognition are feature-based techniques. Feature-based techniques extract local feature descriptors from salient points in an image. Recognition is achieved by matching feature descriptors from a query image with those found from a set of training images. Ambiguous matches are eliminated in a verification stage by matching objects using a global affine transformation.

One problem, however, with feature-based techniques is the difficulty of matching found features with those in the database. The size of the feature database can be quite large. In addition, the feature database scales linearly with the number of known objects. One way commonly used to reduce the computational complexity of this search is to use an approximate nearest neighbor (ANN) technique or a hashing technique. However, the limitations of these two techniques become apparent as the number of objects in the database increases. Another problem is that as the feature space becomes more crowded it becomes increasingly difficult to find correct matches, because several good matches might exist for any feature within a query image.

In large feature databases, the ambiguity of the correctly matching feature most likely is unavoidable. If it is assumed that the feature space will be densely populated, then each feature can be assigned to a cluster instead of finding its single closest match within the database. The set of clusters can be created using a modified K-means clustering algorithm during training. The number of possible clusters can range from 1,000 to over 10,000.

This set of cluster means creates a vocabulary of features. However, one problem is that the resulting symbols can be quite generic and are rarely object dependent. Another problem with the vocabulary of features approach is ensuring that corresponding features across images are assigned to the same symbol. If the feature appearance varies due to image noise or misestimation of position, scale or rotation, differing symbols maybe assigned.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The feature symbol triplets object instance recognizer and method described herein includes processing and recognizing specific objects in an image. These objects can be any unique object, such as a brand name object, paintings, and landmarks. The feature symbol triplets object instance recognizer and method first finds feature in a query image. The found features then are grouped into groups of three features, called feature symbol triplets (or feature triplets). All possible combinations of three features are generated.

For each of the features a feature descriptors is computed. The feature descriptor describes a feature using, for example, position, scale, and rotation of the feature. The footprint of a feature, which is a small regions or area in the image, is used to compute the feature descriptors. An affine transformation then is computed from these feature triplets using neighboring feature positions. The affine transformation not only describes the position, scale and rotation of a feature, but also the skew of the feature. The affine transformation is used to warp the feature triplets into canonical space to form a geometric shape that is not a right triangle, such as an equilateral triangle. For the equilateral triangle, each of the three features of the feature triplet form the vertices of the equilateral triangle. The affine transformation then is used to warp the feature footprints back in to the original frame.

The features are grouped into clusters or bins using a clustering technique. Each bins is assigned a number. A feature combination is generated for each feature triplet which is a combination of three indices corresponding to bin numbers of each of the three features contained in the feature triplet. To avoid ambiguity, if two features in a feature triplet have the same index, the triplet is not used.

Potential matches between feature triplets in the query image and feature triplets in training images then are found using an inverse lookup table. The inverse lookup table contains the feature combination of three indices at each entry in the table. The potential matches are verified by examining the spatial relationship between pairs of triplets. In particular, reference points are found in the training images, and then projected into the query image using the affine transformation. If the object is a planar object, a potential match is verified if the projected reference points lie at a single point in the query image. If the object is a non-planar object, a potential match is verified if the projected reference points lie along a line in the query image.

The feature symbol triplets object instance recognizer and method uses an affine transformation based on feature triplets to warp the feature triplets into an equilateral triangle in canonical space. This warping to an equilateral triangle is symmetric, and the ordering of the triplets does not affect the result. Moreover, as compared to existing methods, there is less overlap of features. Thus, the feature symbol triplets object instance recognizer and method is faster, more efficient, and more reliable than existing techniques.

The feature symbol triplets object instance recognizer and method computes the affine transformations from the neighboring feature positions (such as feature centers) instead of using local properties. This reduces the variance of the features, which achieves greater reliability in matching as compared to existing methods. Moreover, computing affine transformations using neighboring feature positions is more repeatable than using image gradients. This means that the affine transformation as computed by the feature symbol triplets object instance recognizer and method is more repeatable across multiple images.

Computing affine transformations from neighboring feature positions also decreases the feature descriptor density. The scale and orientations of each feature are not computed locally for each feature, but instead they are computed using the three positions of the feature triplet. This means that the features look different from each other, which spreads out the feature descriptor density.

DRAWINGS DESCRIPTION

Referring now to the drawings in which like reference numbers represent corresponding parts throughout:

DETAILED DESCRIPTION

Figure 1:
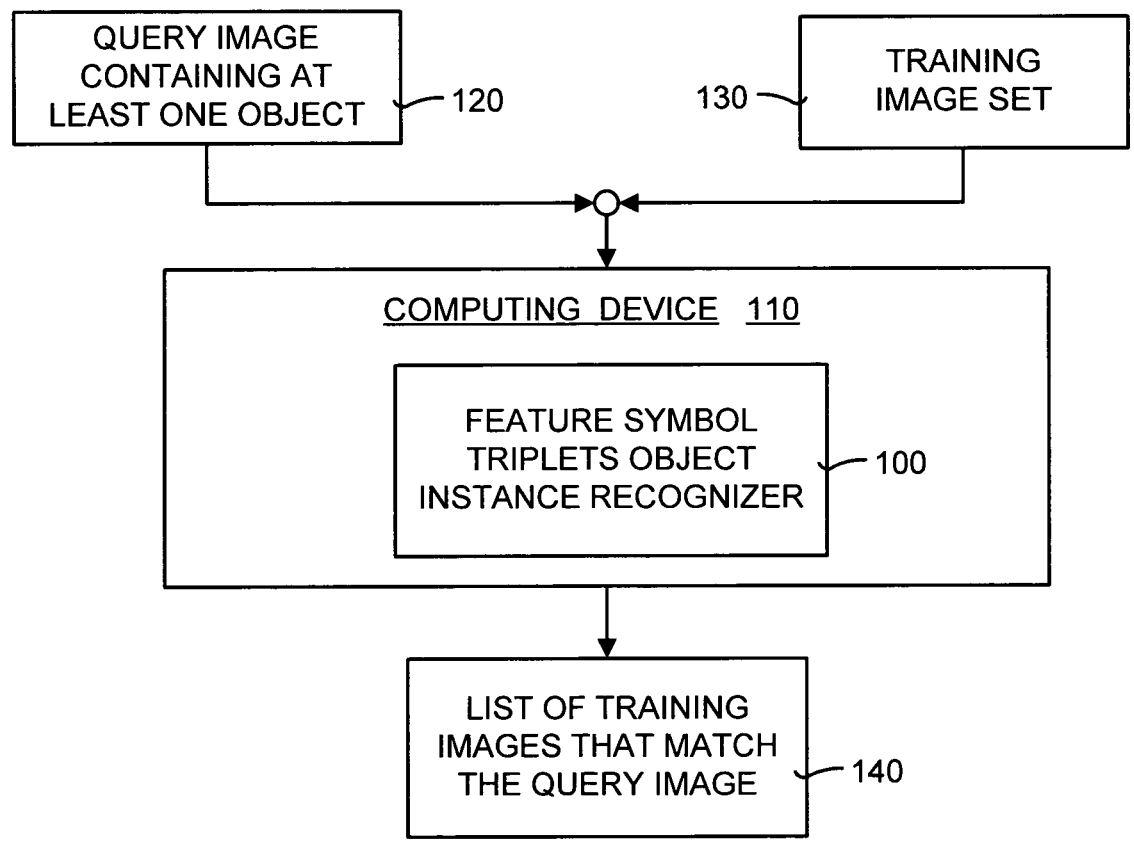
FIG. 1 illustrates and exemplary implementation of the feature symbol triplets object instance recognizer and method disclosed herein.

In the following description of the feature symbol triplets object instance recognizer and method, reference is made to the accompanying drawings, which form a part thereof, and in which is shown by way of illustration a specific example whereby the feature symbol triplets object instance recognizer and method may be practiced. It is to be understood that other embodiments may be utilized and structural changes may be made without departing from the scope of the claimed subject matter.

I. Introduction

Object recognition remains a challenging problem in computer vision. Object instance recognition is the task of recognizing specific objects, such as cereal boxes or soda cans. Billions of such unique objects occupy the world, and finding a computationally feasible method for recognition can be difficult. However, recognizing these objects in an accurate and efficient manner is an important task for many applications.

Ideally, the computational costs should scale with the complexity of the testing image, and not the size of the object database. In order to accomplish this goal, the feature symbol triplets object instance recognizer and method described herein achieves detection and recognition of objects based on triplets of feature descriptors. Each feature is given a label based on a modified K-means clustering algorithm. Object matching is then done by inverse lookup within a table of possible triplets.

The ambiguity of the matches is further reduced by having each triplet vote on its proposed object center. For planar objects, the proposed object centers should cluster at a single point. In general, assuming orthographic projection, the proposed centers will lie along a line. If enough triplets are in agreement on a specific object's center, the object is labeled as detected.

II. General Overview

The feature symbol triplets object instance recognizer and method works particularly well at finding highly-textured, non-deformable objects in an image. These highly-textured, non-deformable objects include cereal boxes and other grocery store items.

The general idea behind the feature symbol triplets object instance recognizer and method is to find repeatable features, and match the repeatable features between a query image and training images. It is desirable that the features are unique. A feature should be unique enough such that the feature is not found on another object. This allows the feature to be distinguished from other features. By way of example, a registered trademark or logo could be a repeatable feature.

More specifically, the feature symbol triplets object instance recognizer and method finds small regions or "patches" in the image, and applies a transformation to the patches in order to identify any similarity between patches in a query image and patches in training images. Next, all similar patches are found, and then pairs of images are aligned to determine if the patches agree in the position of the object. If they do, then it is said that object is found.

FIG. 1 illustrates and exemplary implementation of the feature symbol triplets object instance recognizer and method disclosed herein. It should be noted that FIG. 1 is merely one of several ways in which the feature symbol triplets object instance recognizer and method may implemented and used.

Referring to FIG. 1, the feature symbol triplets object instance recognizer 100 resides on a computing device 110. In general, the feature symbol triplets object instance recognizer 100 finds repeatable features between a query image and training images in order to identify an instance of an object in the query image. More specifically, as shown in FIG. 1, the feature symbol triplets object instance recognizer 100 inputs a query image containing at least one object 120. In addition, a training image set 130 is input to the feature symbol triplets object instance recognizer 100. The training image set 130 contains a plurality of training images, which contains objects that may be in the query image 120.

Figure 2:
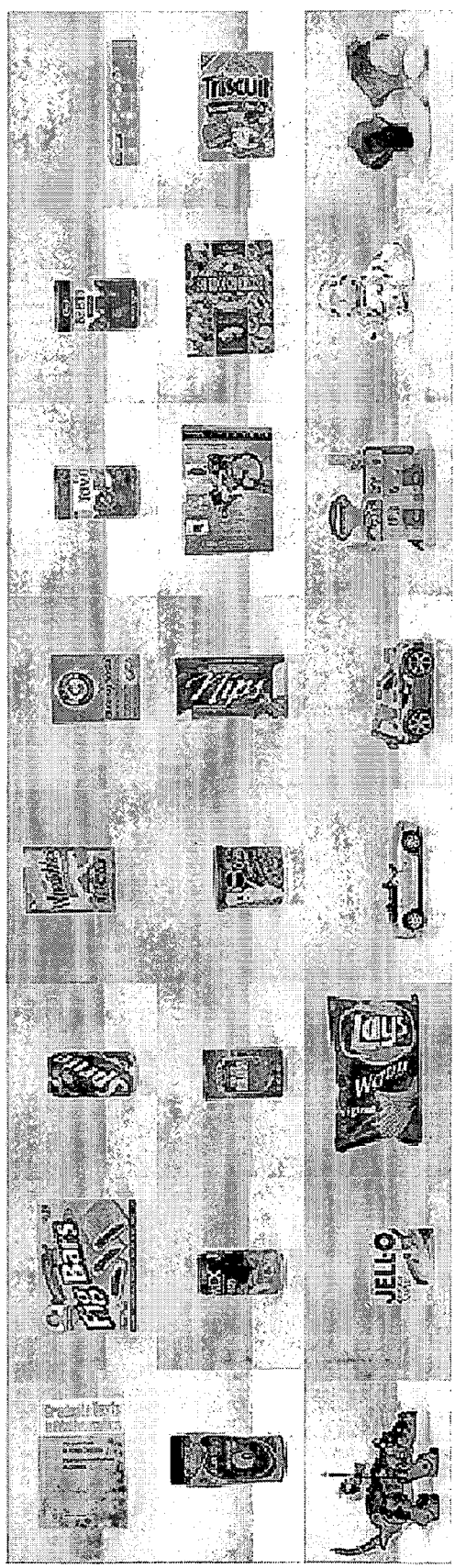
FIG. 2 illustrates an exemplary training image set.

FIG. 2 illustrates an exemplary training image set 200, where the exemplary training image set 200 is an example of the training image set 130. The exemplary training image set 200 contains 24 training images. Each of these training images contains an image of an object.

Referring back to FIG. 1, the query image containing at least one object 120 and the training image set 130 are processed by the feature symbol triplets object instance recognizer 100. As described in detail below, the feature symbol triplets object instance recognizer 100 determines repeatable features in the query image 120 that matches one of the training images in the training image set 130. The output of the feature symbol triplets object instance recognizer 100 is a list of training images that match the query image 140.

III. Structural Overview

The structure of the feature symbol triplets object instance recognizer 100 now will be discussed. In order to more fully understand the structure of the feature symbol triplets object instance recognizer 100, the details of an exemplary embodiment are presented. However, it should be noted that this exemplary embodiment is only one of several ways in which the feature symbol triplets object instance recognizer 100 may be implemented and used.

Figure 3:
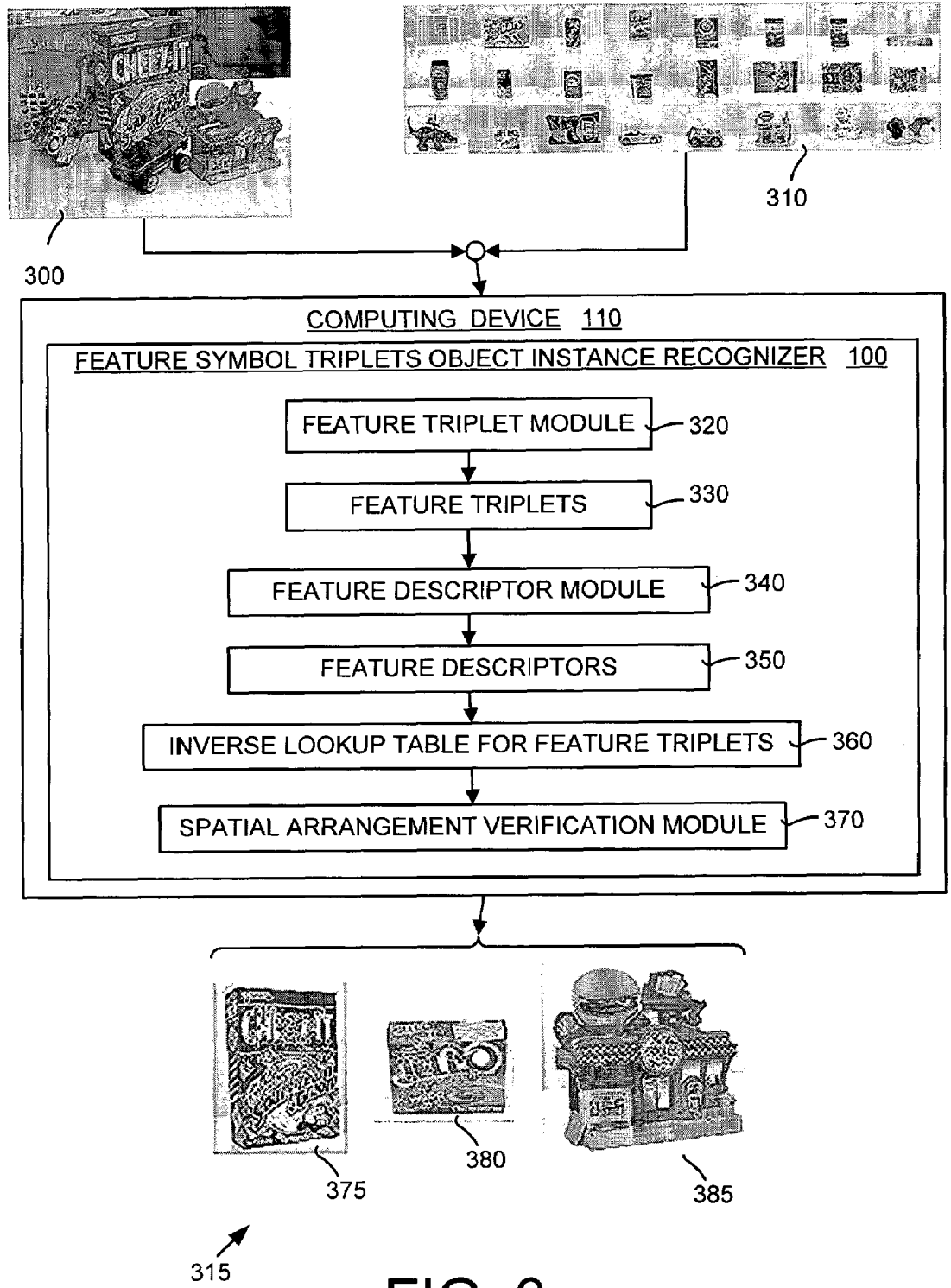
FIG. 3 is a block diagram illustrating the details of the feature symbol triplets object instance recognizer shown in FIG. 1.

FIG. 3 is a block diagram illustrating the details of the feature symbol triplets object instance recognizer 100 shown in FIG. 1. In general, the feature symbol triplets object instance recognizer 100 processes a query image 300 and compares it to a training image set 310 containing a plurality of images. A list of training images 315 that match the query image 300 then are output from the feature symbol triplets object instance recognizer 100.

The feature symbol triplets object instance recognizer 100 resides on the computing device 110. The feature symbol triplets object instance recognizer 100 includes a feature triplet module 320, which generates feature triplets 330 in the query image 300. A feature descriptor module 340 defines feature descriptors 350 for the feature triplets 330. An inverse lookup table 360 is used to find the training images in the training image set 310 that contain identical patches to the query image 300. A spatial arrangement verification module 370 further verifies that the patches are identical, based on spatial arrangement.

The output of the feature symbol triplets object instance recognizer 100 is the list of training images 315 that match the query image 300. In this example, as shown in FIG. 3, the list of training images 315 includes a first matching object 375, a second matching object 380, and a third matching object 385. It should be noted that the first 375, second 380, and third matching objects 385 are also found in the query image 300.

IV. Operational Overview

Figure 4:
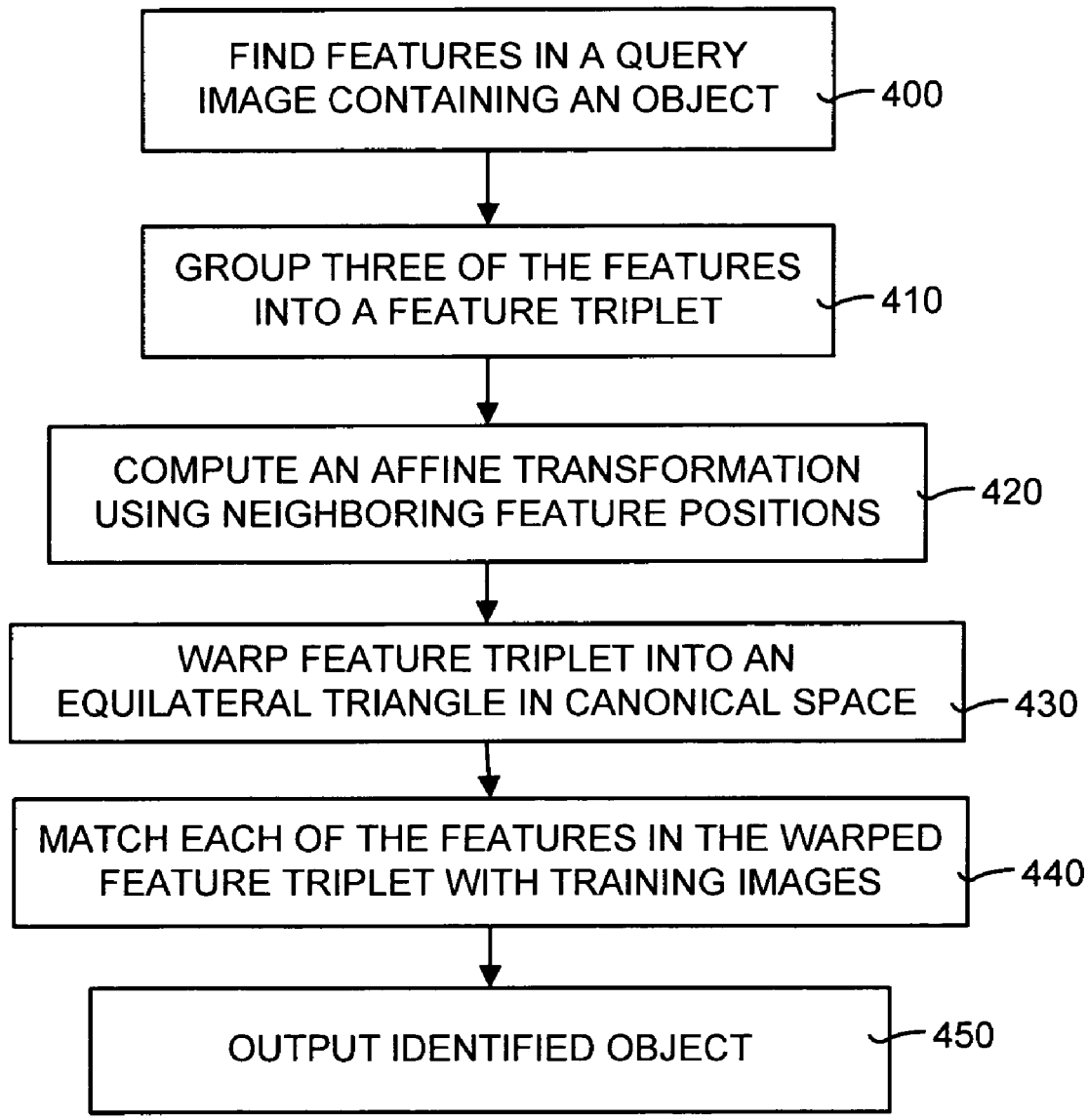
FIG. 4 is a general flow diagram illustrating the general operation of the feature symbol triplets object instance recognizer shown in FIGS. 1 and 3.

The operation of the feature symbol triplets object instance recognizer 100 and method used therein shown in FIGS. 1 and 3 now will be discussed. FIG. 4 is a general flow diagram illustrating the general operation of the feature symbol triplets object instance recognizer shown in FIGS. 1 and 3. In general, the feature symbol triplets object instance recognition method compares finds objects in a query image by comparing portions of the object to training images. If the object in the query images matches one of the training images, then a match is found and the object is identified In particular, as shown in FIG. 4, the feature symbol triplets object instance recognition method begins by finding features in a query image, where the query object contains at least one object (box 400). Three of the features found are grouped into a feature triplet (box 410). Next, an affine transformation is computed using neighboring feature positions (box 420). In other words, for each of the three features in the feature triplet the affine transformation for that feature is computed using its neighboring other two features in the triplet.

The computed affine transformation is used to warp the feature triplet into a geometric shape in canonical space (box 430). This geometric shape takes the form of a triangle. In a one embodiment, the geometric shape is an equilateral triangle. Next, each of the features in the warped feature triplet are matched with training images (box 440). The result of this matching is an identified object that is output (box 450).

Figure 5:
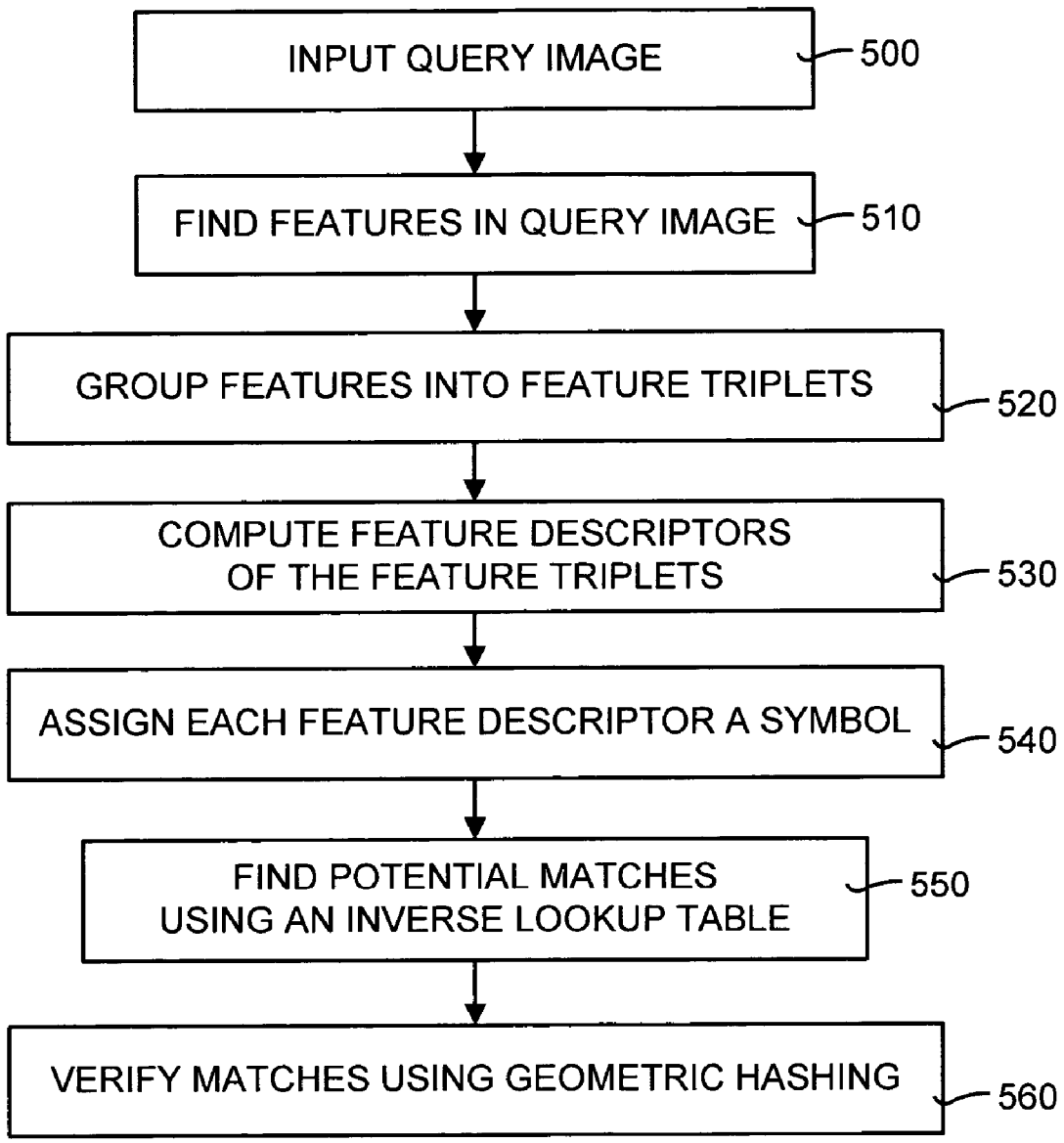
FIG. 5 is a detailed flow diagram illustrating the further details of the feature symbol triplets object instance recognizer method shown in FIG. 4.

FIG. 5 is a detailed flow diagram illustrating the further details of the feature symbol triplets object instance recognizer method shown in FIG. 4. As shown in FIG. 5, the feature symbol triplets object instance recognition method begins by inputting a query image to be processed (box 500). The query image is the image that a user sends to the feature symbol triplets object instance recognizer 100. The user has a query image and wants to know what is in the image, or something about the image.

The method then finds features in the query images (box 510), and then groups the features in to feature triplets (box 520). The use of feature triplets by the feature symbol triplets object instance recognition method serves two purposes. First, the space of possible feature descriptors and their repeatability are increased. Second, by assigning features to symbols and using an inverse lookup table, possible matches can be found efficiently. The computational cost of finding features is increased over standard single feature existing methods, but the cost is independent of the training database size. Once the feature symbols are found, matching training images to the query image is very efficient, and scales to large databases of objects.

Next, the feature symbol triplets object instance recognition method computes feature descriptors of the feature triplets (box 530). To increase the reliability of each feature descriptor, the local image appearance is warped using an affine transformation computed from the triplet's feature positions. Thus, a feature location will have a different descriptor for each triplet. One advantage of this is that the repeatability of the feature descriptors is increased, while also increasing the area in feature space in which the descriptors can be contained.

Two popular techniques for finding repeatable features in an image are a scale invariant feature transform (SIFT) technique, and a Harris corner feature technique. The SIFT technique gives a rotation, scale, and orientation of a feature. In particular, an image patch of a feature has a particular size (such as 64×64 pixels). If the patch is scaled larger, the sampling will be larger, and if the patch is scaled smaller then the sampling is smaller. In the patch there also is rotation. The SIFT feature descriptor ensures that orientation is consistent. Thus, a SIFT feature descriptor gives position, scale, and rotation of each feature. It should be noted that with the SIFT technique, the position of a feature is found fairly accurately, while the scale and rotation are much more difficult to compute. Thus, there is much more accuracy in position than in scale and rotation.

There typically will be hundreds of these repeatable features in the query image. A standard way perform object instance recognition is to find all the features, determine which features look similar, and take those features and try to find some transformation that lines up the features. If this can be found, then it can be said the object is found.

There are two problems with this standard way. First, when scaling to large databases, it is desirable to use a feature that is repeatable and unique. The problem is that the variance is large for each feature, especially of the scale and rotation. If the scale and rotation are off even slightly, the one feature will be off from the feature trying to be matched. So the two features are matched, they will not be quite equal, especially because the scale and rotation are prone to error. Thus, it is desirable to decrease the variance.

Second, in feature space the area in which features can exist are limited. If the uniqueness of each feature is to be increased, there are two things that can be done. First, increase the feature space so that the features lie in a larger area. This is called decreasing the "feature density". Two, makes the variance smaller so that way each feature is more specific. The whole goal is to increase the reliability and uniqueness of the features to increase the speed at which objects can be matched and also increase the number of objects that are matched.

As was stated earlier, the location of the features typically is found well, but the scale and rotation are much more prone to error. Instead of looking at each feature individually, the feature symbol triplets object instance recognition method examines triplets of features, or groups of three features. These three features can then be warped to form an equilateral triangle.

One difference between the feature symbol triplets object instance recognizer and method described herein and the SIFT technique is that SIFT only describes the scale and rotation of a feature. But the affine transformation used by the feature symbol triplets object instance recognition method also describes the skew of a feature. The advantage of using an affine transformation with skew is that skew better represents a 2D representation of a 3D image than does only scale and rotation.

Another advantage of the feature symbol triplets object instance recognition method is that the affine transformation is not computed based on local image gradients. Technique that compute affine transformations using local image gradients are not as informative as using the feature positions. Using the feature positions with an affine transformation, as is done by the feature symbol triplets object instance recognition method, instead of using local image gradients with an affine transformation, yields a more reliable and repeatable transformation.

In addition, the feature symbol triplets object instance recognition method warps the feature triplets into an equilateral triangle in canonical space. One advantage of using equilateral triangles in canonical space is symmetry. The three feature triplets warped into an equilateral triangle are symmetric, and there ordering does not affect the result. Another advantage of warping feature triplets to equilateral triangles in canonical space is that the equation for computing the affine transformation is simpler. Yet another advantage of using equilateral triangles is that there is less repetition because there is less overlap of features, as compared to non-equilateral triangle techniques.

Each feature descriptor then is assigned a symbol (box 540). Each feature is assigned to a cluster instead of find its single closest match within the database. One way a set of clusters is created is by using a modified K-means clustering technique during training. By way of example, the number of clusters can range from 1,000 to more than 10,000.

This set of clusters creates a vocabulary of features. The resulting symbols can be quite generic and are rarely object dependent. To resolve ambiguity in matching symbols, the feature symbol triplets object instance recognition method matches feature triplets (or groups of three symbols). For each triplets, potential matches are found using an inverse lookup table (box 550). For each triplet, the object within which they exist are stored using the inverse lookup table. This allows the feature symbol triplets object instance recognition method to efficiently find all potentially matching objects.

Since the same triplet might appear in multiple objects, the feature symbol triplets object instance recognition method verifies matches using geometric hashing (box 560). For each pair of potential matching triplets, positions of the three features are used to compute an affine transformation between the query and training images. A center of the object then is projected on the query image. If enough triplets agree on the position of the object center, then the object is labeled as detected.

V. Operational Details

The details of the feature symbol triplets object instance recognition method now will be discussed.

Generating Feature Triplets

In current object instance recognition techniques, each object is represented as a set of training images. The images in turn are then represented as a bag of local feature descriptors, $f_i \in \{f_1, \ldots, f_n\}$. Each descriptor is based on local image statistics, such as edge magnitudes. The accuracy of these methods largely depends of the distinctiveness of each separate feature. As a result, large databases of features are needed. For example, one database of an existing technique contained 40,000 features from 32 images.

As the feature database becomes more crowded, many erroneous matches can exist within a small neighborhood of the correct match. The instant technique defines the variance of the correct corresponding feature descriptors across images as the feature variance, $\sigma_F$. The feature variance depends on the amount of image noise and the reliability of the computed position, scale and rotation of the features.

Figure 6A:
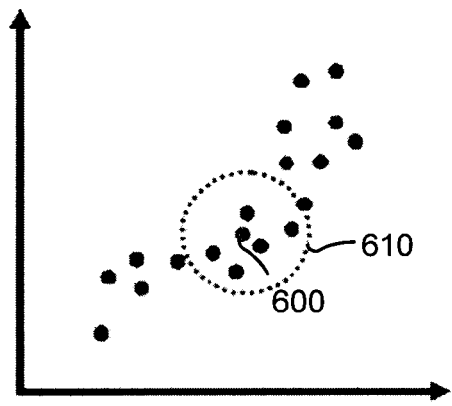
FIG. 6A illustrates the standard features and variance for existing object instance recognition techniques.

FIGS. 6A to 6D illustrate feature density using various techniques. It should be noted that in FIGS. 6A to 6D, features are represented as black dots in feature space, a query feature 610 is shown as a red dot, and the extent of a first feature variance 610 is shown as the dotted red circle. FIG. 6A illustrates the standard features and variance for some existing object instance recognition techniques. As shown in FIG. 6A, multiple features may lie within the feature variance 610 of the query feature 600, which results in ambiguous matches.

Figure 6B:
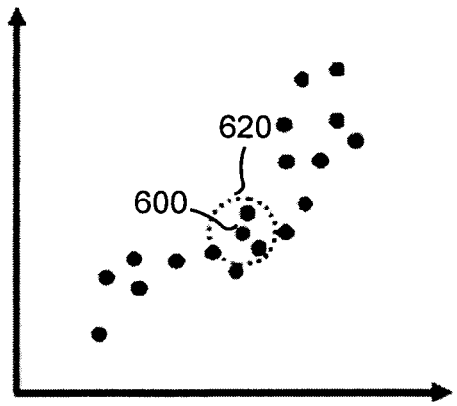
FIG. 6B illustrates reducing the feature variance.
Figure 6C:
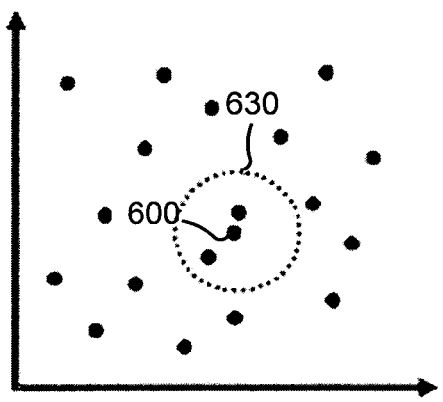
FIG. 6C illustrates decreasing the feature density.

There are two approaches to reducing the chances of a false match. In a first approach, the repeatability of the features can be increased, which reduces the feature variance. As shown in FIG. 6B, this means that the extent of a second feature variance 620 around the query feature is reduced compared to the first feature variance 610. In a second approach, the feature density is decreased. This means that the space in which features exist can be increased, so that fewer features lie close to the correct match. This effectively reduces the feature density. As shown in FIG. 6C, a third feature variance 630 around the query feature 600 has the same diameter as the first feature variance 610 shown in FIG. 6A, but the number of features within the third feature variance 630 is reduced compared to the first feature variance 610. Standard rotation and scale invariant methods attempt to find locally similar image patches. As a result, the feature descriptors are more similar, and only a fraction of the entire feature space will be occupied, as shown in FIGS. 6A and 6B.

Figure 7A:
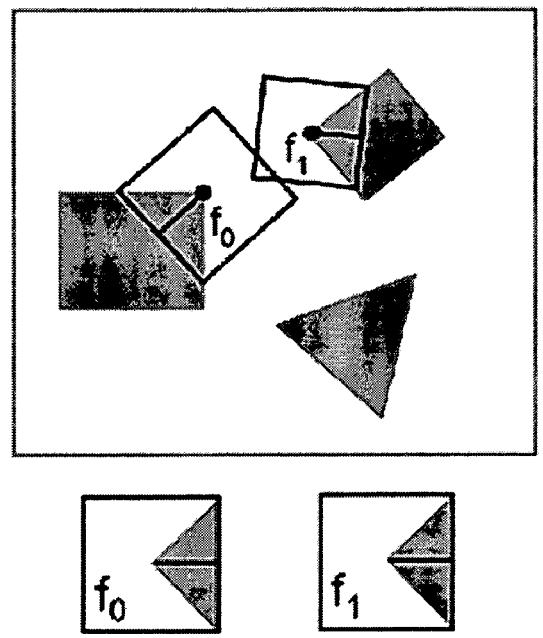
FIG. 7A illustrates that standard approaches using only a portion of the feature space.
Figure 7B:
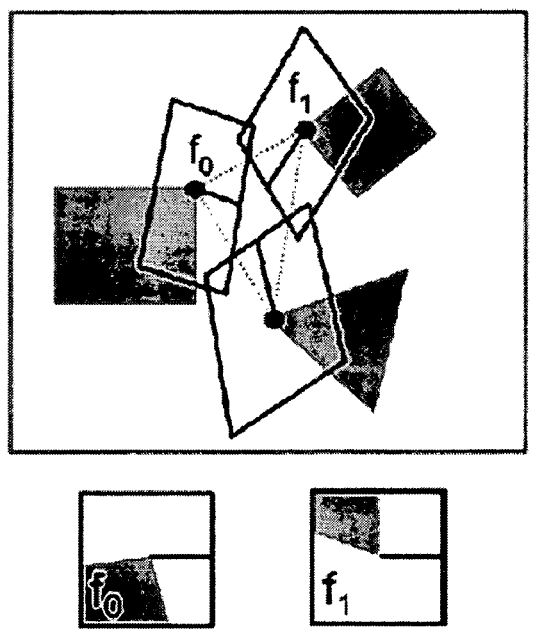
FIG. 7B illustrates using feature triplets, as used by the feature symbol triplets object instance recognizer and method, whereby the features occupy a larger set of the feature space.

FIGS. 7A and 7B illustrate the effects of invariant approaches. FIG. 7A illustrates that standard approaches only use a portion of the feature space. In particular, standard approaches using rotation and scale invariance attempt to find locally similar patterns. As shown in FIG. 7A, the scale and rotation invariance will lead to many features appearing similar. In contrast, invariant approaches using triplets return features based on neighboring feature positions. As a result, as shown in FIG. 7B, these same features will have differing features descriptors.

Figure 6D:
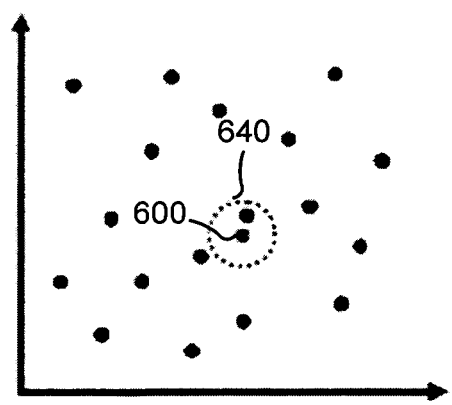
FIG. 6D illustrates a combined approach of FIGS. 6B and 6C used by the feature symbol triplets object instance recognizer and method to both reduce the feature variance and decrease the feature density.

To address this problem, the feature symbol triplets object instance recognizer uses a method that improves the repeatability of the features while also increasing the space in which they exist. As shown in FIG. 6D, this method incorporates both approaches shown in FIGS. 6B and 6C. In other words, this method both reduces the variance and decreases feature density by increasing the area that features can occupy. As shown in FIG. 6D, the fourth feature variance 640 around the query feature 600 illustrates both a smaller variance and reduced feature density.

The method of the feature symbol triplets object instance recognizer relies on a novel technique for finding feature footprints. The footprint of a feature is the area, usually a rectangular region, of the image used to compute the feature descriptor. In existing techniques, the footprint is computed from the feature's position, scale and rotation. The feature symbol triplets object instance recognizer and method instead compute the footprint using groups of three features, or triplets. Using the new footprints, standard feature descriptors, such as SIFT feature descriptors, then are used.

The set of feature triplets, designated as T, consists of all groups of three features that exist within a certain distance of each other in pixel and scale space. The details of one way of creating the triplets can be found below. Any resulting triplets where the feature positions form an overly narrow triangle are discarded. More specifically, triplets in which the ratio of the longest distance between features to the sum of the two shortest distances is greater than a distance threshold, T=0.75, are removed.

The feature symbol triplets object instance recognizer and method uses the feature positions, which are typically computed more accurately than the scale and orientation, to compute an affine transformation, $A_i$, from image space into a canonical frame. Within the canonical frame, the three points are warped to positions (0,0), (−1, sqrt(3)), (1, sqrt(3)). If the position of feature $f_{i,j} \in t_i$ is $p_{i,j} = (x_{i,j}, y_{i,j})$ for $j \in \{0,1,2\}$, then:

$$A_i \begin{bmatrix} x_{i,0} \\ y_{i,0} \\ 1 \end{bmatrix} = \begin{bmatrix} 0 \\ 0 \\ 1 \end{bmatrix}, A_i \begin{bmatrix} x_{i,1} \\ y_{i,1} \\ 1 \end{bmatrix} = \begin{bmatrix} -1 \\ \sqrt{3} \\ 1 \end{bmatrix}, A_i \begin{bmatrix} x_{i,2} \\ y_{i,2} \\ 1 \end{bmatrix} = \begin{bmatrix} 1 \\ \sqrt{3} \\ 1 \end{bmatrix} \quad (1)$$

Figure 8A:
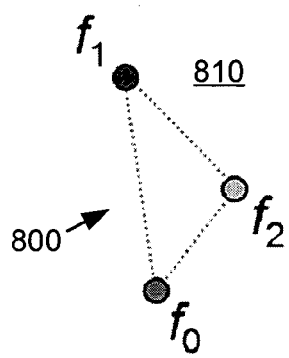
FIG. 8A illustrates an original feature triplet in an original frame.
Figure 8B:
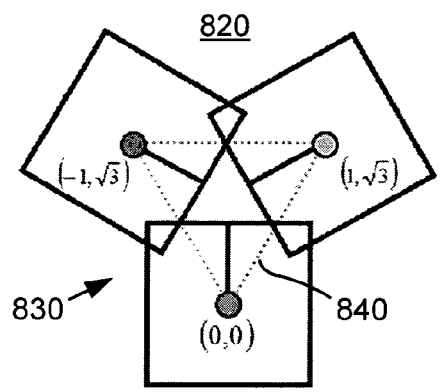
FIG. 8B illustrates the original feature triplet shown in FIG. 8A after warping to a canonical frame with feature footprints.
Figure 8C:
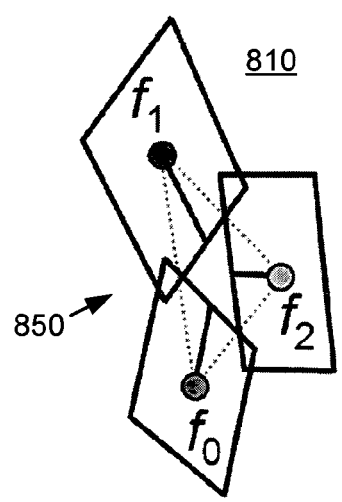
FIG. 8C illustrates the results of using the affine transformation to warp the features back into the original frame.

FIGS. 8A to 8C illustrate finding feature footprints using feature triplets. More specifically, FIG. 8A illustrates an original feature triplet 800 in an original frame 810 having three features, $f_1$, $f_2$, and $f_3$. It should be noted that the lines on each of the features represent the orientation of the object. They are used when sampling, to align the features. The three features can be warped into a canonical frame (such as into an equilateral triangle).

Whereas existing techniques use an area that an image patch was sampled from, the feature symbol triplets object instance recognizer and method includes a novel technique for finding the box. Instead of using scale and rotation of each feature, the feature symbol triplets object instance recognizer and method uses three boxes surrounding each of the three features canonical space.

FIG. 8B illustrates the original feature triplet 800 after warping to a canonical frame 820 with feature footprints. As shown in FIG. 8B, this creates a equilateral triangle feature triplet 830. More specifically, the three points of the features are specifically chosen for the canonical frame so that they form an equilateral triangle 840, shown by the dotted line in FIG. 8B. In other words, each of the features of the equilateral triangle feature triplet 830 are vertices of the equilateral triangle 840. It should be noted that in FIG. 8B, feature $f_i,0$ is mapped to (0,0). As shown in FIG. 8B, the orientation of each box is pointing towards the center.

After warping to the equilateral triangle 840 in the canonical frame 820, an affine transformation is used to warp the feature footprints back into the original frame 810. FIG. 8C illustrates the results of using the affine transformation to warp the features back into the original frame 810. As shown in FIG. 8C, a transformed feature triplet 850 is in the original frame 810. It should be noted that the feature symbol triplets object instance recognizer and method goes from image space to canonical space, then back to image space. The patches become the patches of the image that were actually sampled to find the feature. In other words, they become the areas of the image that was sampled to find the feature. In the working example, the size of the patches or samples were 8×8 (or 64) samples.

Next, $A_i$ is computed by:

$$A_i = \begin{bmatrix} 0 & -1 & 1 \\ 0 & \sqrt{3} & \sqrt{3} \\ 1 & 1 & 1 \end{bmatrix} \begin{bmatrix} x_{i,0} & x_{i,1} & x_{i,2} \\ y_{i,0} & y_{i,1} & y_{i,2} \\ 1 & 1 & 1 \end{bmatrix}^{-1} \quad (2)$$

Within the warped frame 820 shown in FIG. 8B, the feature footprints of the three feature descriptors are placed at the corners of the equilateral triangle. In addition, the orientations of the three feature descriptors are pointing towards the center of the equilateral triangle. Within the canonical frame, the size of a footprint's side is 2, the same as the distance between feature locations.

Using $A_i$, the feature descriptors within the triplet are invariant to affine transformations between images. As a result, the feature variance of correctly corresponding descriptors across images should decrease over simpler scale and rotation models. Affine invariant features have also been proposed for Harris corner detectors using image gradients. However, if there is not enough local gradient information, the computed affine transformations may not be robust.

Even though the triplet features are invariant to more general affine transformations, and not just scale and rotation, the space which the descriptors can occupy is larger. This is due to the affine transformations being computed using neighboring feature positions and not local image properties. For example, in FIG. 7A, both features will have the same descriptor if their scales and rotations are computed from local image gradients. On the other hand, with the triplet approach used by the feature symbol triplets object instance recognizer and method, as shown in FIG. 7B the descriptors will vary based on the location of the neighboring features. As a result, the possible area in feature space that can be occupied by the feature descriptors is larger, as shown in FIG. 6D.

Matching Feature Triplets

The previous section described how feature triplets are created and how their feature positions are used to find affine invariant descriptor footprints. The final result is a set of three SIFT feature descriptors for each triplet. In this section, the technique used by the feature symbol triplets object instance recognizer and method to efficiently matching triplets across images is described.

The number of feature triplets is typically much larger than the number of features. By way of example, for an average image of 300 features, there exists $$\binom{300}{3}/3 = 1,485,033$$

possible feature triplets. Since the feature symbol triplets object instance recognizer and method limits the set of possible triplets based on the relative positions and scales of features, the number of triplets is reduced to about 10,000. Given a large training set, a database of descriptors would be quite crowded. If an attempt is made to find correct corresponding features, mismatches are inevitable. This will be the case even though the space in which the triplet features can exist is larger.

Therefore, instead of storing all feature descriptors within the training data set, the feature symbol triplets object instance recognizer and method groups features of similar appearance into clusters. The cluster centers $S=s_1, \ldots, s_N$ form a vocabulary of symbols over the set of descriptors. Each descriptor $f_{i,j}$ in a query image is then mapped $m(f_{i,j})=s_k$ to the closet symbol. Clustering of features for generalization can be useful for object categorization. However, the quantization of the feature space reduces the distinctiveness of features, and as a result, its usefulness for object instance recognition.

While the descriptiveness of each individual feature is reduced, each feature triplet, $t_i$, will have three symbols, $s_i,0$, $s_i,1$, $s_i,2$, associated with it. Given the large number of possible triplets (on the order of $1,000^3$), the uniqueness of each triplet is increased over single features. As a result, the number of training images that contain a specific triplet will be much smaller than those that contain any single feature. Using an inverse lookup table that is described below, all training images that contain the same triplet can be found efficiently. However, before describing the inverse lookup table, the method for clustering feature descriptors used by the feature symbol triplets object instance recognizer and method first will be described.

Clustering Feature Descriptors

There are two goals to clustering feature descriptors. The first goal is to have as many feature clusters as possible. The sparseness and efficiency of the inverse lookup table used by the feature symbol triplets object instance recognizer and method increases as the number of symbols or clusters increases The second goal is, given two corresponding features across images, to have them both be assigned to the same symbol or cluster. These two goals must be balanced, since the more clusters that exist, the more likely corresponding features will be assigned to different clusters.

Ideally, the feature descriptors group together into easily identified clusters. Unfortunately, feature descriptors are more evenly distributed as shown in FIG. 6D. Thus, finding appropriate cluster boundaries is difficult.

Given the relatively uniform distribution of feature descriptors, the spacing between clusters is as important as their exact position. To minimize the chances of corresponding features being assigned to different symbols, the feature symbol triplets object instance recognizer and method enforces a rule that the variance of feature positions within a cluster must be greater than some multiple of the variance between corresponding features across images. Thus, the feature symbol triplets object instance recognizer and method modifies the standard K-means algorithm that iteratively groups descriptors into clusters, by enforcing a certain separation between clusters. After each iteration, any clusters whose centers are less than $\beta\sigma_F$ apart, are merged together. To maintain a constant number of clusters, any merged cluster is assigned a new center chosen randomly from the descriptor set. In a working example, $\beta\rho_F=0.03$. This provides well-distributed features among the clusters.

In the working example, the SIFT feature descriptor had 128 values (or a 128-dimensional feature descriptor). The desire is to find all matching triplets in the set of training images that match a triplet in the query image. This is accomplished by matching the three feature descriptors within the triplets.

In order to be efficient, the features were clustered into 1200 bins, and an index was assigned to each feature. The index was assigned by defining feature symbols (or words). Thus, 1200 representative features were defined. Then, for each feature in the query image, the closest of the 1200 representative features that the feature lies closest to was found. That index was assigned to the feature.

Comparing the feature against each of the 1200 representative features can be time consuming. In order to save time, the working example used a hierarchical technique, which works by taking the 128-D vector and shrinking it down to an 8-D vector by averaging together certain indexes. It should be noted that other technique can be used, such as hashing techniques or multi-resolution techniques. It the feature was within a certain threshold, the next level was where the feature was compared to all 128 representative features. In other words, the feature was compared on a rough scale, and, if the feature was close, then it was examined on a finer scale.

Before a lookup was performed, the feature combinations were reordered from smallest to highest, to avoid looking up all the combinations of numbers. By way of example, a feature triplet combination of (987, 50, 113) was reordered as (50, 113, 987). It should be noted that if two features were assigned to the same index, the triplet was not used, since its ordering was ambiguous.

Inverse Lookup Table

At this point each feature in the query image had an index. The working example then created a large 3-D table ($1200^3$ different entries), known as an inverse look-up table. A triplet having a combination, such as (50, 113, 987), is selected and then it was found which triplets in the training data had the same combination of features. For each entry in the inverse lookup table, the table returned a list of training images that also contained the matching feature. The working example then found the training image having the most matching feature triplets.

Given a triplet $t_i$ with symbols $s_i,0$, $s_i,1$, $s_i,2$, it is desirable to efficiently find all training images with similar triplets. In order to accomplish this goal, the feature symbol triplets object instance recognizer and method uses an inverse lookup table. For each possible combination of three symbols, an index is stored of every training image that contains a triplet with the same symbols. Thus, if there are N symbols, the lookup table will contain $N^3$ entries. Given a large size of N (typically over 1000), most entries within the lookup table will be empty. A sparse matrix representation is used for the table to reduce memory requirements. To ensure all rotationally symmetric triplets are grouped together, the symbols are reordered in ascending order, $s_i,0 < s_i,1 < s_i,2$, before lookup. If more than one feature is assigned the same symbol, the mapping between triplet features is ambiguous. Since a unique mapping is needed in the verification stage (which is discussed below), feature symbol triplets object instance recognizer and method discards these triplets.

One possible method for object detection is to store the probability of each triplet $t_i$, given the object $O_j$, $P(t_i|O_j)$. Assuming the triplets are independent, the likelihood of each object can be computed as:

$$P(O_j|T) \propto P(O_j) \prod_{t_i \in T} \frac{P(t_i|O_j)}{P(t_i)} \quad (3)$$

where $P(t_i|O_j)$ is equal to some small value, $\epsilon$, when the feature triplet has not been observed for the object.

If objects are detected based on the threshold values of equation (3), the precision and recall results would be quite poor. While the use of triplets increases the descriptiveness over the use of single symbols, this "bag of words" approach will result in many ambiguous matches. For this reason, the feature symbol triplets object instance recognizer and method does not use this approach. Instead, as described in the next section, the feature symbol triplets object instance recognizer and method uses relative feature positions as well as feature symbols to find reliable matches.

Object Verification

Since the symbols within a feature triplet are not unique to a specific object, additional constraints are needed to guarantee a correct match. One possibility is to use the spatial relationship between triplets. A global affine model could be assumed for the objects, and then sets of triplets could be found that vote for the same object and have similar affine transformations using a Hough transform or RANSAC. This approach works well for objects with a single dominant plane, such as cereal boxes or books. However, the global affine model is violated for non-planar objects or when there is significant projective distortion.

Instead of assuming a single global affine model, the feature symbol triplets object instance recognizer and method makes use of a geometric hashing technique that computes an affine transformation between each pair of matching triplets. Given a reference point, $p_R$ within a training image $I_j$ (usually assumed to be the object center), the feature symbol triplets object instance recognizer and method projects the point into the query image using the computed affine transformation. If an object is present, the set of projected points from each matching triplet pair will obey certain relationships, which is discuss in detail in the following sections.

Projecting Reference Points

Figure 9A:
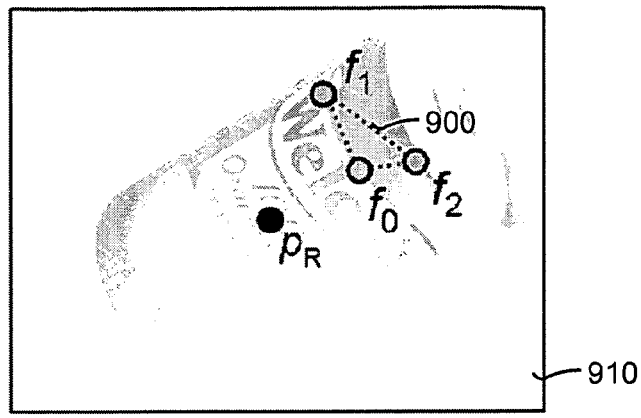
FIG. 9A illustrates a triplet with reference point in a training image.
Figure 9B:
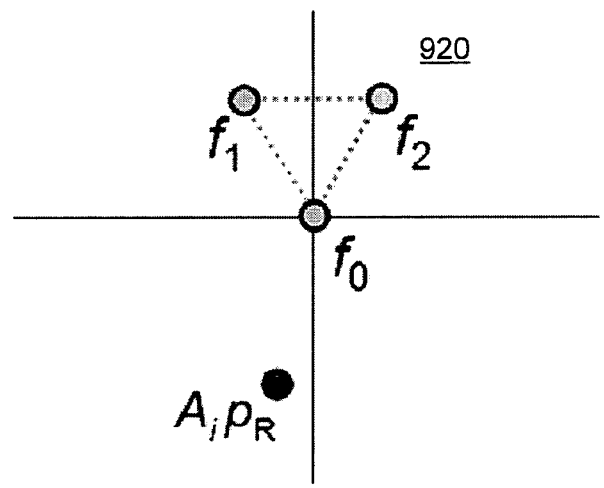
FIG. 9B illustrates the reference point, shown in FIG. 9A, projected to a canonical frame using the same affine transformation.
Figure 9C:
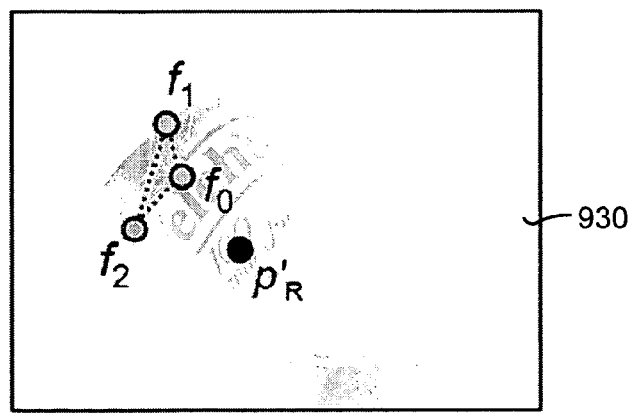
FIG. 9C illustrates the reference point projected back into the query image.

As we discussed above, the feature symbol triplets object instance recognizer and method compute an affine transformation, $A_i$, which projects a triplet $t_i$ into a canonical frame. Using the same affine transformation, the feature symbol triplets object instance recognizer and method projects a reference point, $p_R$, into the same canonical frame. FIGS. 9A to 9C illustrate the reference point projection technique used by the feature symbol triplets object instance recognizer and method. FIG. 9A illustrates a triplet 900 with reference point, $p_R$, in a training image 910. FIG. 9B illustrates the reference point, $p_R$, projected to canonical frame $A_i p_R$ 920, using the same affine transformation as previously used. FIG. 9C illustrates the reference point $p'_R = A'^{-1}_i A_i p_R$ projected into the query image 930.

Given a matching triplet $t'_i$ in another image with corresponding affine transformation $A'_i$, The reference point $p_R$ can be projected from one image into another, as shown in FIGS. 9A to 9C, using the equation:

$$p'_R = A'^{-1}_i A_i p_R \quad (4)$$

The reference point $p_R$ is usually assumed to be the object center in training image $I_j$. If the object is roughly centered in the image, the image center may be used.

To verify the detection of objects in a query image, the reference point needs to be projected using each triplet. Instead of storing the entire matrix $A_i$ in the inverse lookup table for each triplet in the training data set, the feature symbol triplets object instance recognizer and method stores the location of the reference point in the canonical frame, $A_i p_R$.

Planar Objects

For a planar object with an orthographic plus scale camera model, the transformation from a training image to an observed image can be modeled using a global affine transformation. In many cases, the more general projective camera model can also be well approximated locally using this affine model. Assuming an object can be modeled using a global affine transformation $A^*$, all correctly matching triplets have an affine transformation such that $A'^{-1}_i A_i = A^*$. As a result, all of the projected reference points $p'_R$ lie at a single point.

Figure 10A:
FIG. 10A illustrates a first training image used in the working example.
Figure 10B:
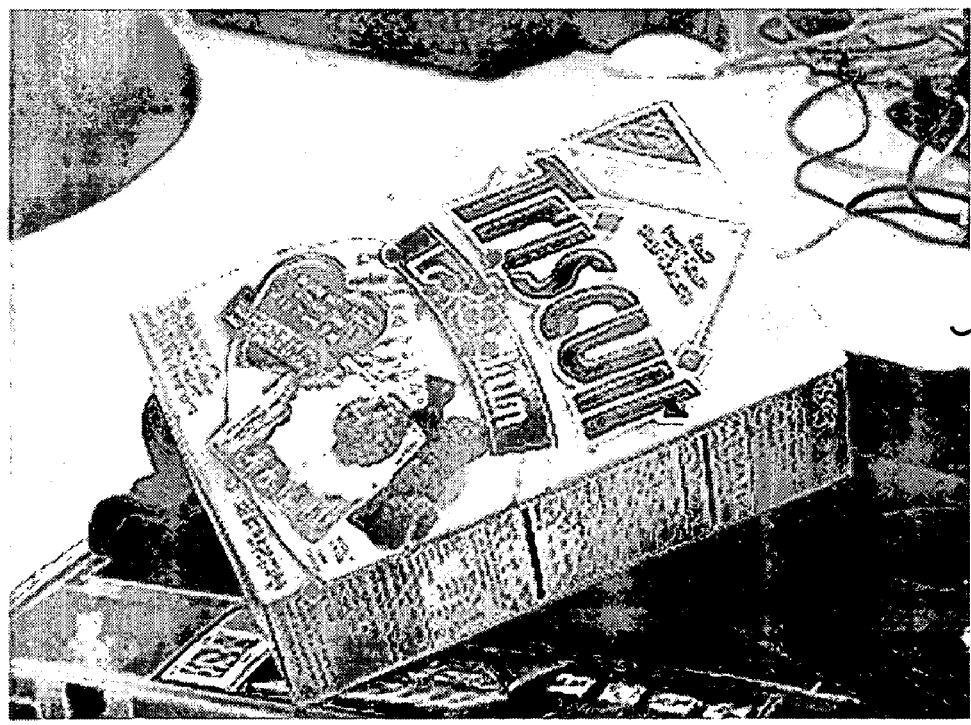
FIG. 10B illustrates a first query image used in the working example.
Figure 10C:
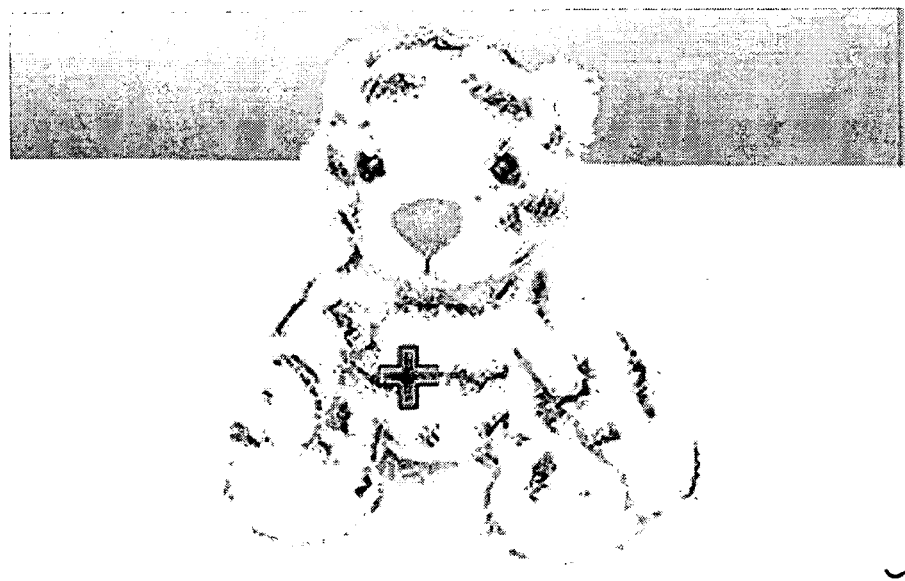
FIG. 10C illustrates a second training image used in the working example.
Figure 10D:
FIG. 10D illustrates a second query image used in the working example.

FIGS. 10A to 10D illustrate an example of projected reference points. FIG. 10A illustrates a first training image 1000, and FIG. 10B illustrates a first query image 1010. FIG. 10C illustrates a second training image 1020, and FIG. 10D illustrates a second query image 1030. In FIGS. 10A and 10C, the reference points are shown as green crosses in the first 1000 and second 1020 training images. In FIGS. 10B and 10D, the projected reference points are shown as green dots in the first 1010 and second 1030 query images.

Object detection for planar objects then can be accomplished using a simple two-dimensional (2-D) histogram binning technique called geometric hashing. An entry in the histogram is created for each 8×8 block of pixels within the query image. Every projected reference point is then added to the closest 2-D bin and its 8 connected neighbors. The quality of the match is measured by the number of points within the largest bin of the histogram. Even if many incorrectly matched triplets exist, it is unlikely they will vote on the same bin. Thus, most false matches can be easily eliminated.

Non-Planar Objects

Unlike planar objects, the projection of a non-planar object cannot be modeled using a single affine transformation. To understand how this affects the projection of the reference points, how this projection is accomplished will now be reexamined.

Figure 11:
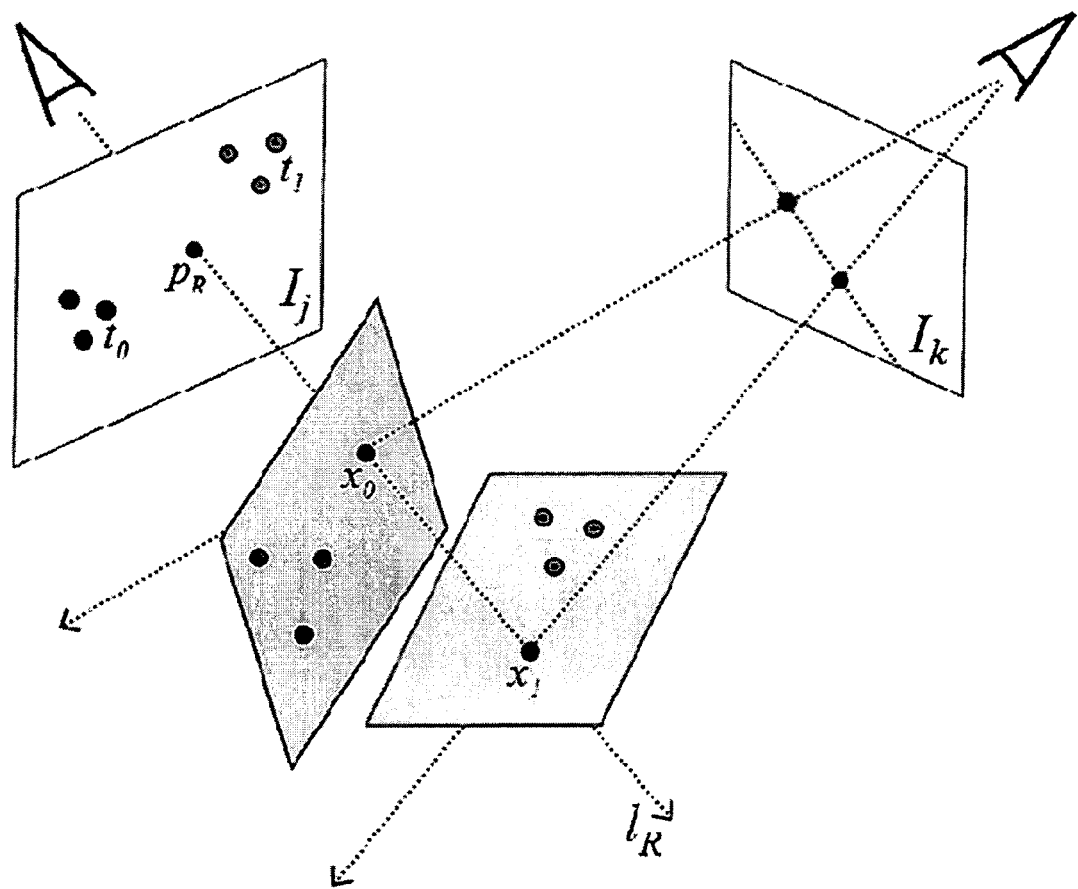
FIG. 11 illustrates that the projections of a reference point lie along a line in a query image of the working example.

Each feature $f_k$ within a triplet $t_i$ has a corresponding unknown 3-D location $x_k$ on the object. Similarly, the three features within a triplet $t_i$ correspond to some 3-D plane, $q_i$. Since the reference point, $p_R$, is projected relative to the triplet's positions, it is assumed that the reference point also lies on this unknown plane $q_i$. The hypothesized 3-D position $x_i$ of the reference point $p_R$ is then determined by the intersection of the plane $q_i$ with the line $I_R$ projecting from the camera center of the training image $I_j$ through the true 3-D point x* of the reference point. The position of the projected reference point $p'_R$ then is just the projection of the 3-D point $x_i$ onto the query image. FIG. 11 illustrates that the projections of the reference point $p_R$ lie along the line $I_R$ in the query image $I_k$. The 3-D planes created by two triplets are shown in red and blue. The intersection of these planes with the line $I_R$ is shown as points $x_0$ and $x_1$. When these points are projected onto the query image $I_k$, they lie along a line, which is the projection of $I_R$ on $I_k$.

For planar objects, the 3-D planes $q_i$ corresponding to each triplet are the same. As a result, the hypothesized 3-D locations $x_i$ of the reference points, as well as their projections into the query image, are identical. For non-planar objects, the planes $q_i$ will vary between triplets. Thus, the hypothesized locations $x_i$ of the reference points will lie at different points along the line $I_R$ and project to different locations within the query image. However, since the points $x_i$ all lie along a single 3-D line $I_R$, their projections onto the query image will also lie on a line (commonly referred to as the epipolar line for $p_R$).

Assuming an orthographic plus scale model, the object centers should lie exactly on a line. However, projective distortions and errors in computing the feature centers will introduce noise. Several methods are available for robustly finding 2-D lines in point clouds, such as RANSAC, Hough transform, and so forth.

Despite the generality of the line fitting approach, it has been found experimentally that it is not necessary. There are two reasons for this. First, the spread of the points on the line is related to the difference in rotation of the object in the training and query image (similar to the disparity range in stereo vision). If the training images are taken close together (such as less than 25 degrees apart), then a simple point cluster detector as discussed above is adequate. Second, the position of the feature detectors become increasingly unreliable as the rotation between images increases, thereby reducing the ability to match highly separated views.

Final Verification

Each feature in an image should only correspond to a single object. If a one-to-one mapping constraint between features and training images is not imposed, it is possible for the same feature in a query image to be matched to different training images. This constraint is enforced by assigning features to training images using a greedy approach. First the training image is found having the highest number of matching triplets. Next, all of the features in those triplets are assigned to that training image. To prevent the features from matching to multiple training images, all of the triplets from the query image that use these features are removed. The best matching training image then is found using the remaining triplets and iteratively repeating this process until no training image has more than K matching triplets.

VI. Working Example and Results

In order to more fully understand the feature symbol triplets object instance recognizer and method disclosed herein, the operational details of an exemplary working example are presented. It should be noted that this working example is only one way in which the feature symbol triplets object instance recognizer and method may be implemented. This working example was run on a Intel Xeon 2.79 GHz machine with 2 GB of memory.

Described in this section are the implementation details of the working example of the feature symbol triplets object instance recognizer and method that finds feature triplets and efficiently matches them across images. The features were detected using the Difference of Gaussian (DoG) approach. Each feature had a pixel location $p_k$, scale $\sigma_k$ equal to the standard deviation used to compute the DoG, and rotation $\theta_k$. The triplets were found by grouping all sets of three features that were within a certain distance in pixel and scale space. In scale space, the ratio of feature scales had to lie between 0.5 and 2.0. The distance between feature locations had to be less than $\xi\theta_k$, where $\xi=8$. So that the number of triplets would be further reduced, and to increase the accuracy of the projected reference points, the average distance between features had to be greater than 20 pixels. Once the feature footprints were found, the SIFT feature descriptor was used.

When clustering features detectors, 1,200 features were found having the highest occurrence in the training set and differing in appearance greater than $\beta\sigma_F$. To reduce the computational cost of assigning symbols to features, the difference between the average within the 8 orientations of the SIFT descriptor was first found for the feature and the cluster mean. If the difference was less than a threshold (0.45) a full comparison was performed.

Even though the geometric hashing technique using 2-D binning described above is relatively efficient, it was desirable not to create a set of 2-D bins for every possible training image. In practice, the set of training images was first found from which a minimum number of reference points (such as 20) projected within the boundary of the query image. Even if several training images contained a certain triplet, as stored in the inverse look-up table, only a fraction of the projected reference points would also lie within the boundary of the image. Using this approach, the number of training images that needed to be considered was greatly reduced.

Results

In this section, results for the working example of the feature symbol triplets object instance recognizer and method are presented and discussed. In order to test the feature symbol triplets object instance recognizer and method, a database of 118 objects was collected. Approximately 100 of the objects were box or can-shaped grocery store items. The remainder of the objects were toys, such as cars and stuffed animals. Each object had 48 training images sampled at different orientations. Three rows were taken vertically with 25 degree spacing and 16 columns horizontally with 22.5 degree spacing. FIG. 2 illustrates a sample of the training images used in the working example. To simulate larger datasets, the objects were chosen so that some were very similar in appearance, such as the juice cans, while others varied greatly, such as the toys.

Two testing datasets were collected: non-occluded single objects and occluded multiple objects. The non-occluded single object data set contained images of a single object with little or no occlusion. The multiple object data set contained images with up to 6 objects and possible occlusions.

Figure 12A:
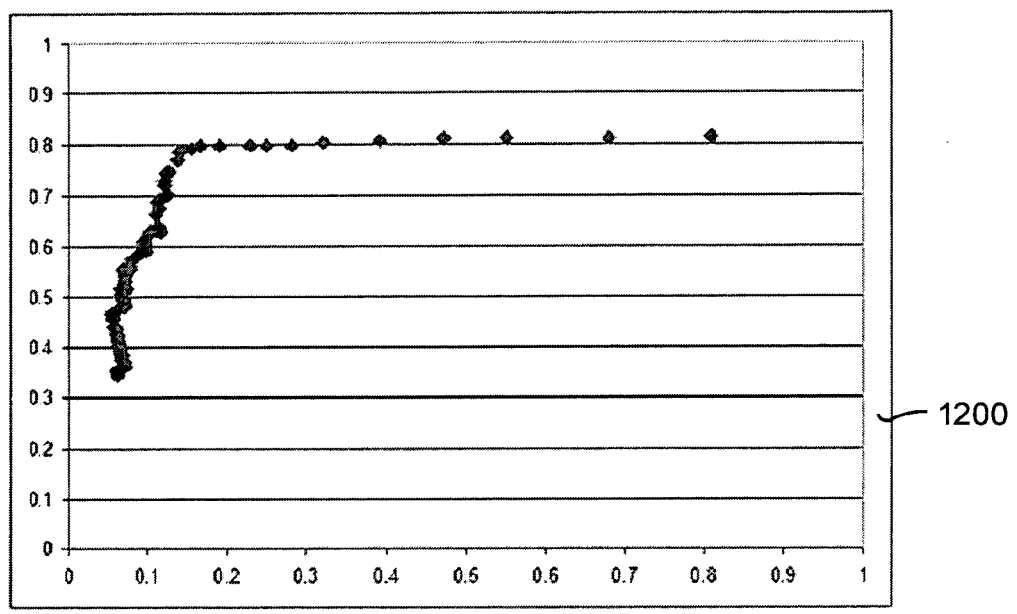
FIG. 12A illustrates a first ROC curve for the single object database used in the working example.
Figure 12B:
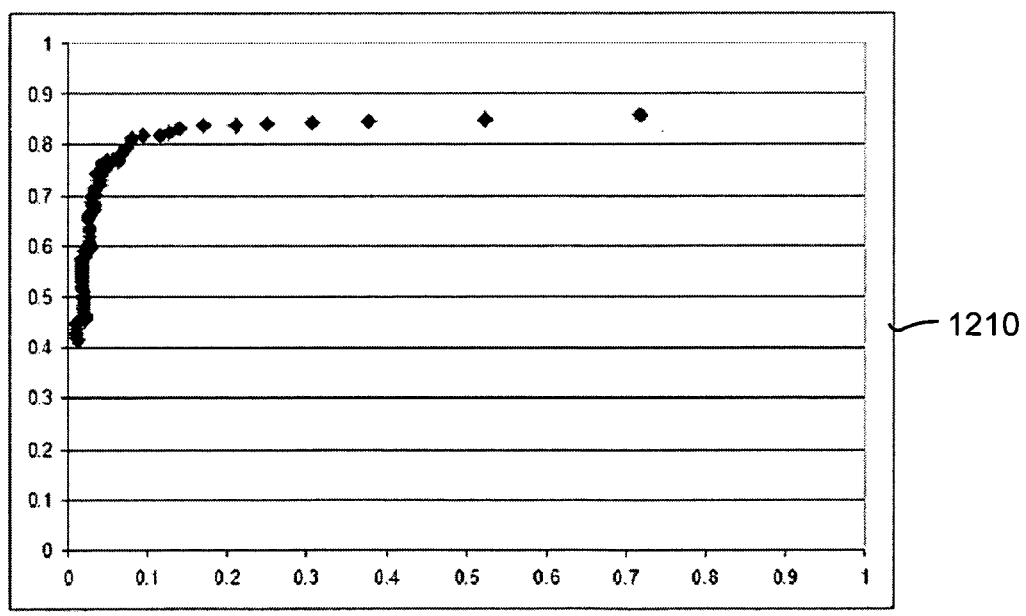
FIG. 12B illustrates a second ROC curve for the multiple object database used in the working example.

For each of the two categories, an ROC curve was created with values of κ, the number of matching triplets needed for detection, ranging from 3 to 100. FIG. 12A illustrates a first ROC curve 1200 for the single object database used in the working example. FIG. 12B illustrates a second ROC curve 1210 for the multiple object database used in the working example. As shown in FIG. 12A, with κ=15, an 78.8% detection rate was obtained with 14.4% false positives for the single object database As shown in FIG. 12B, an 81.1% detection rate was obtained with 8% false positives for the multiple object database. Since each object only occurred at most once n each image, if the same object was detected more than once, it was labeled as a false positive. In general, the algorithm was most successful with objects that were highly textured with some planar surfaces.

Figure 13A:
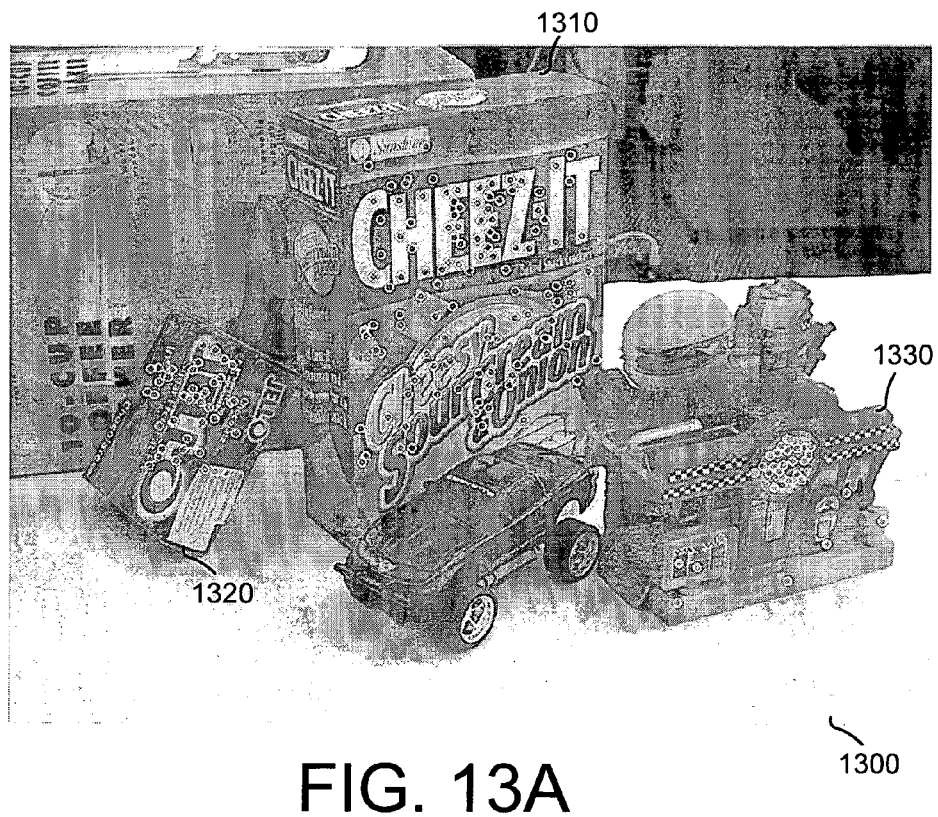
FIG. 13A illustrates a first query image used in the working example.
Figure 13B:
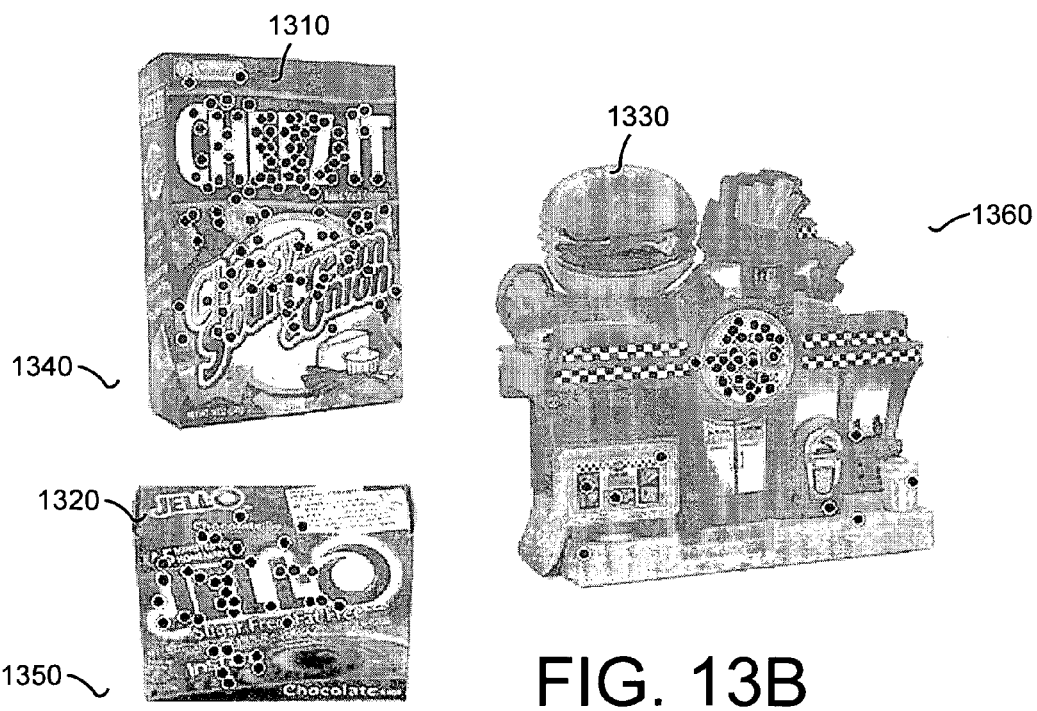
FIG. 13B illustrates the training images of the objects found in the first query image of FIG. 13A.

FIGS. 13A and 13B illustrate a first example of object matches found by the feature symbol triplets object instance recognizer and method in the working example. In particular, FIG. 13A illustrates a first query image 1300 used in the working example. The first query image 1300 contains at least three objects, including a first object 1310, a second object 1320, and a third object 1330. The first query image 1300 was processed by the feature symbol triplets object instance recognizer and method, and training images containing matches for the objects 1310, 1320, 1330 in the first query image 1300 were found.

FIG. 13B illustrates the training images of the objects found in the first query image 1300. More specifically, in FIG. 13B, training images containing matches of objects in the first query image 1300 shown in FIG. 13A. A first training image 1340 contains the first object 1310, a second training image 1350 contains the second object 1320, and a third training image 1360 contains the third object 1330.

Figure 14A:
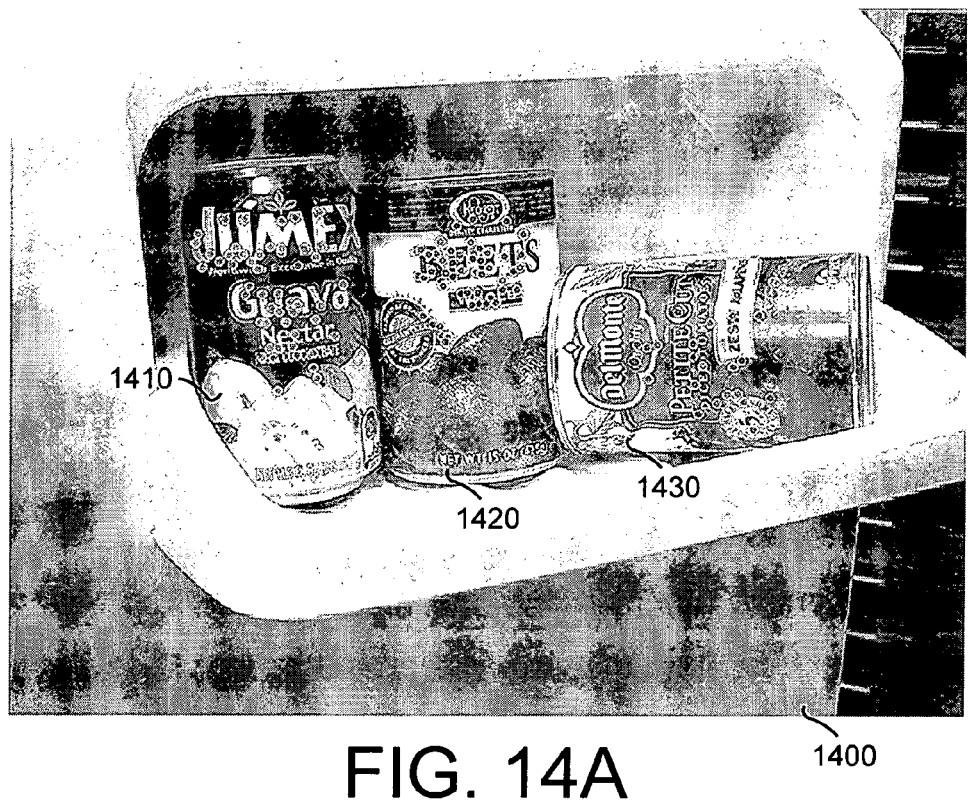
FIG. 14A illustrates a second query image used in the working example.
Figure 14B:
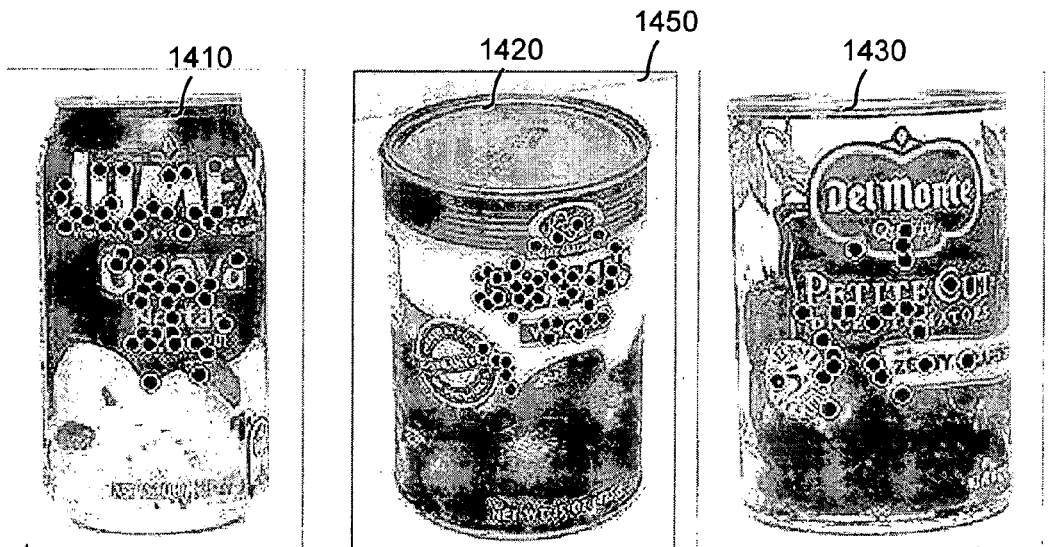
FIG. 14B illustrates the training images of the objects found in the second query image of FIG. 14A.

FIGS. 14A and 14B illustrate a second example of object matches found by the feature symbol triplets object instance recognizer and method in the working example. FIG. 14A illustrates a second query image 1400 used in the working example. The second query image 1400 contains at least three objects, including a fourth object 1410, a fifth object 1420, and a sixth object 1430. The second query image 1400 was processed by the feature symbol triplets object instance recognizer and method, and training images containing matches for the objects 1410, 1420, 1430 in the second query image 1400 were found.

FIG. 14B illustrates the training images of the objects found in the second query image 1400. In FIG. 14B, training images containing matches of objects in the second query image 1400 shown in FIG. 14A. A fourth training image 1440 contains the fourth object 1410, a fifth training image 1450 contains the fifth object 1420, and a sixth training image 1460 contains the sixth object 1430.

Figure 15A:
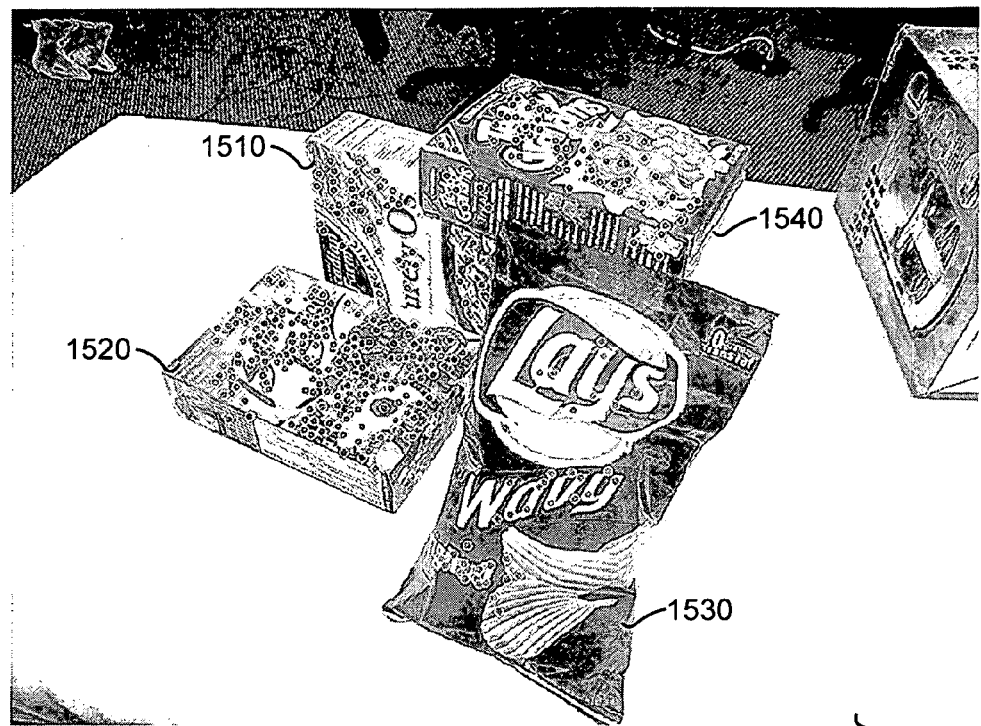
FIG. 15A illustrates a third query image used in the working example.
Figure 15B:
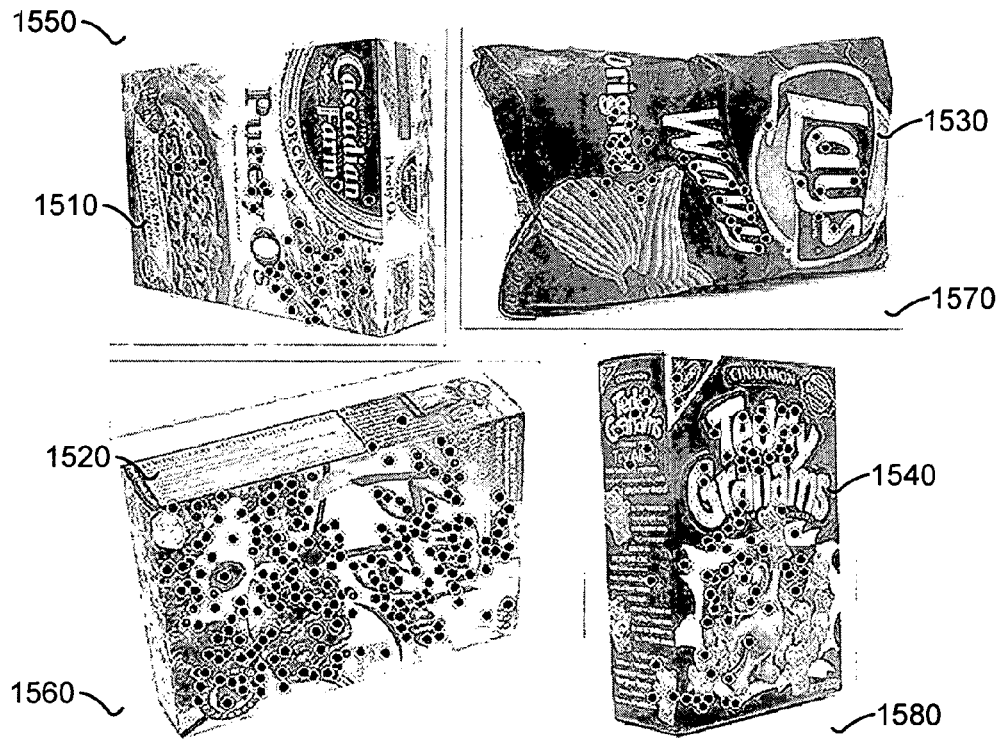
FIG. 15B illustrates the training images of the objects found in the third query image of FIG. 15A.

FIGS. 15A and 15B illustrate a third example of object matches found by the feature symbol triplets object instance recognizer and method in the working example. In particular, FIG. 15A illustrates a third query image 1500 used in the working example. The third query image 1500 contains at least four objects, including a seventh object 1510, an eighth object 1520, a ninth object 1540, and a tenth object 1550. The third query image 1500 was processed by the feature symbol triplets object instance recognizer and method, and training images containing matches for the objects 1510, 1520, 1530, 1540 in the third query image 1500 were found.

FIG. 15B illustrates the training images of the objects found in the third query image 1500. In particular, in FIG. 15B, training images containing matches of objects in the third query image 1500 shown in FIG. 15A. A seventh training image 1550 contains the seventh object 1510, an eighth training image 1560 contains the eighth object 1520, a ninth training image 1570 contains the ninth object 1530, and the tenth training image 1580 contains the tenth object 1540.

Figure 16A:
FIG. 16A illustrates a specular object.
Figure 16B:
FIG. 16B illustrates an object with little texture.
Figure 16C:
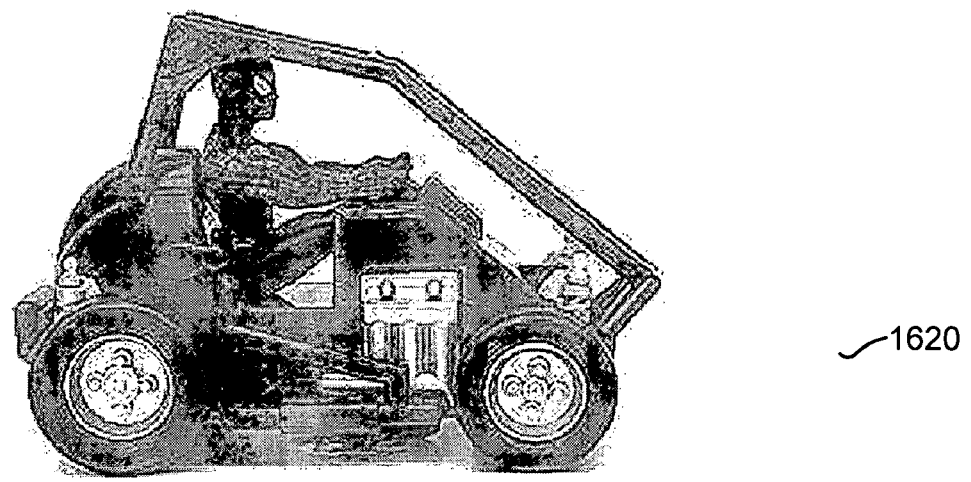
FIG. 16C illustrates a non-planar object.
Figure 16D:
FIG. 16D illustrates a deformable object.

The objects within the database were deliberately chosen to have varying degrees of difficulty for recognition. FIGS. 16A to 16D illustrate some of the most difficult objects. FIG. 16A illustrates a specular object 1600. FIG. 16B illustrates an object with little texture 1610. FIG. 16C illustrates a non-planar object 1620. FIG. 16D illustrates a deformable object 1630. Several of the objects were also taken at angles greater than 30 degrees from any training image.

The computation time for the feature symbol triplets object instance recognizer and method in this working example was between 5 and 20 seconds per query image of size 800×600, depending on the number of features found. Approximately 20% of the time was spent on finding triplets and their descriptors, and 80% of the time was spent on matching feature descriptors with their symbols. Once the feature symbols were known, it took on average 0.3 seconds to search the database of 5664 training images with 14,145,274 triplets for possible matches.

VII. Exemplary Operating Environment

The feature symbol triplets object instance recognizer 100 and method used therein are designed to operate in a computing environment. The following discussion is intended to provide a brief, general description of a suitable computing environment in which the feature symbol triplets object instance recognizer and method may be implemented.

Figure 17:
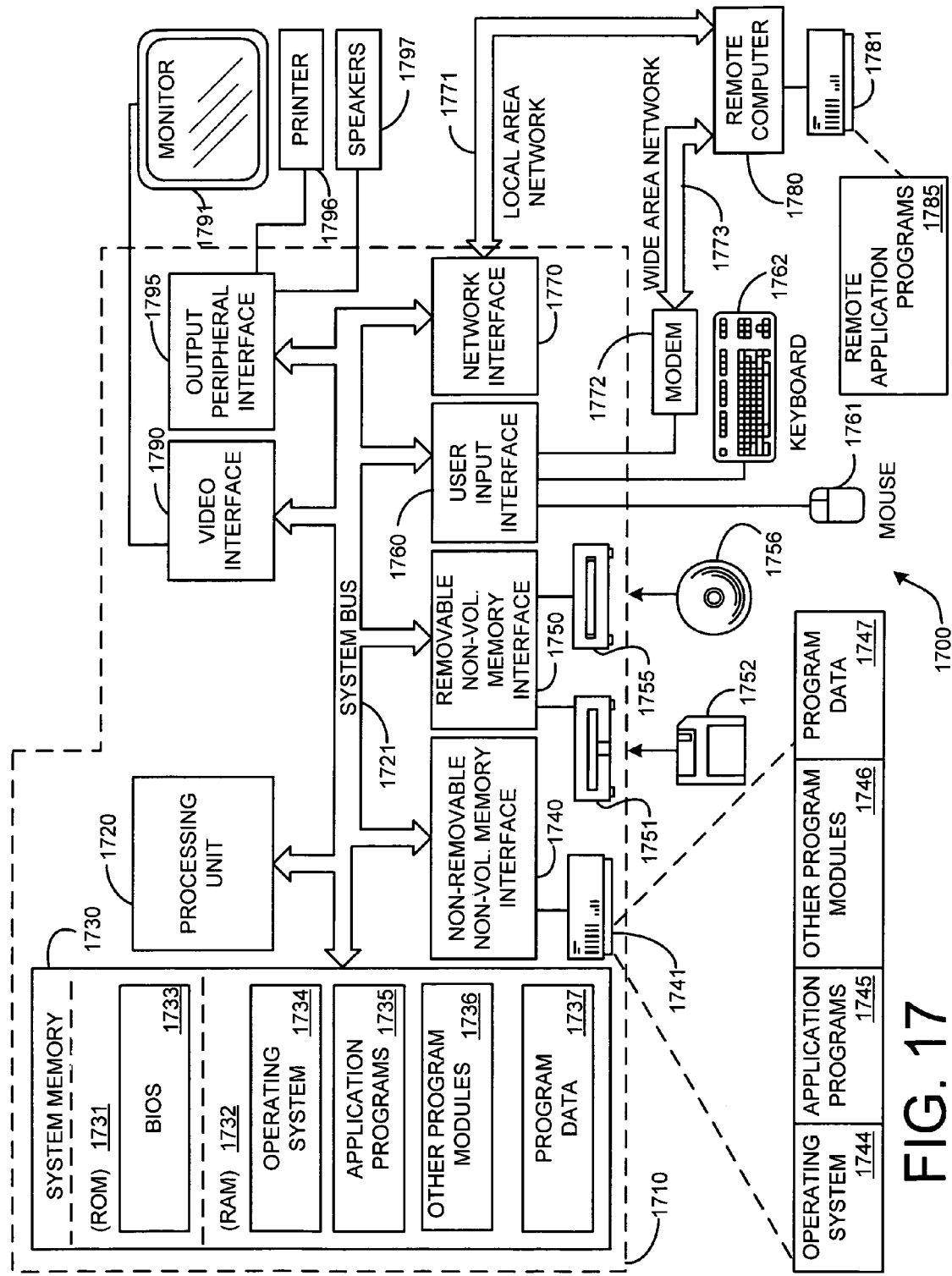
FIG. 17 illustrates an example of a suitable computing system environment in which the feature symbol triplets object instance recognizer and method may be implemented.

FIG. 17 illustrates an example of a suitable computing system environment in which the feature symbol triplets object instance recognizer and method may be implemented. The computing system environment 1700 is only one example of a suitable computing environment and is not intended to suggest any limitation as to the scope of use or functionality of the subject matter described herein. Neither should the computing environment 1700 be interpreted as having any dependency or requirement relating to any one or combination of components illustrated in the exemplary operating environment.

The feature symbol triplets object instance recognizer and method is operational with numerous other general purpose or special purpose computing system environments or configurations. Examples of well known computing systems, environments, and/or configurations that may be suitable for use with the feature symbol triplets object instance recognizer and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The feature symbol triplets object instance recognizer and method may be described in the general context of computer-executable instructions, such as program modules, being executed by a computer. Generally, program modules include routines, programs, objects, components, data structures, etc., that perform particular tasks or implement particular abstract data types. The feature symbol triplets object instance recognizer and method may also be practiced in distributed computing environments where tasks are performed by remote processing devices that are linked through a communications network. In a distributed computing environment, program modules may be located in both local and remote computer storage media including memory storage devices. With reference to FIG. 17, an exemplary system on which to operate the feature symbol triplets object instance recognizer and method includes a general-purpose computing device in the form of a computer 1710 (the computing device 110 in FIG. 1 is an example of the computer 1710).

Components of the computer 1710 may include, but are not limited to, a processing unit 1720 (such as a central processing unit, CPU), a system memory 1730, and a system bus 1721 that couples various system components including the system memory to the processing unit 1720. The system bus 1721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1710 typically includes a variety of computer readable media. Computer readable media can be any available media that can be accessed by the computer 1710 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1710. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1730 includes computer storage media in the form of volatile and/or nonvolatile memory such as read only memory (ROM) 1731 and random access memory (RAM) 1732. A basic input/output system 1733 (BIOS), containing the basic routines that help to transfer information between elements within the computer 1710, such as during start-up, is typically stored in ROM 1731. RAM 1732 typically contains data and/or program modules that are immediately accessible to and/or presently being operated on by processing unit 1720. By way of example, and not limitation, FIG. 17 illustrates operating system 1734, application programs 1735, other program modules 1736, and program data 1737.

The computer 1710 may also include other removable/non-removable, volatile/nonvolatile computer storage media. By way of example only, FIG. 17 illustrates a hard disk drive 1741 that reads from or writes to non-removable, nonvolatile magnetic media, a magnetic disk drive 1751 that reads from or writes to a removable, nonvolatile magnetic disk 1752, and an optical disk drive 1755 that reads from or writes to a removable, nonvolatile optical disk 1756 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1741 is typically connected to the system bus 1721 through a non-removable memory interface such as interface 1740, and magnetic disk drive 1751 and optical disk drive 1755 are typically connected to the system bus 1721 by a removable memory interface, such as interface 1750.

The drives and their associated computer storage media discussed above and illustrated in FIG. 17, provide storage of computer readable instructions, data structures, program modules and other data for the computer 1710. In FIG. 17, for example, hard disk drive 1741 is illustrated as storing operating system 1744, application programs 1745, other program modules 1746, and program data 1747. Note that these components can either be the same as or different from operating system 1734, application programs 1735, other program modules 1736, and program data 1737. Operating system 1744, application programs 1745, other program modules 1746, and program data 1747 are given different numbers here to illustrate that, at a minimum, they are different copies. A user may enter commands and information into the computer 1710 through input devices such as a keyboard 1762 and pointing device 1761, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 1720 through a user input interface 1760 that is coupled to the system bus 1721, but may be connected by other interface and bus structures, such as, for example, a parallel port, game port or a universal serial bus (USB). A monitor 1791 or other type of display device is also connected to the system bus 1721 via an interface, such as a video interface 1790. In addition to the monitor, computers may also include other peripheral output devices such as speakers 1797 and printer 1796, which may be connected through an output peripheral interface 1795.

The computer 1710 may operate in a networked environment using logical connections to one or more remote computers, such as a remote computer 1780. The remote computer 1780 may be a personal computer, a server, a router, a network PC, a peer device or other common network node, and typically includes many or all of the elements described above relative to the computer 1710, although only a memory storage device 1781 has been illustrated in FIG. 17. The logical connections depicted in FIG. 17 include a local area network (LAN) 1771 and a wide area network (WAN) 1773, but may also include other networks. Such networking environments are commonplace in offices, enterprise-wide computer networks, intranets and the Internet.

When used in a LAN networking environment, the computer 1710 is connected to the LAN 1771 through a network interface or adapter 1770. When used in a WAN networking environment, the computer 1710 typically includes a modem 1772 or other means for establishing communications over the WAN 1773, such as the Internet. The modem 1772, which may be internal or external, may be connected to the system bus 1721 via the user input interface 1760, or other appropriate mechanism. In a networked environment, program modules depicted relative to the computer 1710, or portions thereof, may be stored in the remote memory storage device. By way of example, and not limitation, FIG. 17 illustrates remote application programs 1785 as residing on memory device 1781. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for recognizing an instance of a specific object in a query image, comprising:
    finding features in the query image;
    grouping three of the features into a feature triplet;
    computing an affine transformation with skew using neighboring feature positions to warp the feature triplet into a geometric shape in canonical space;
    matching each of the features in the feature triplet with training images to identify the specific object; and
    displaying to a user a list of training images that match the query image to recognize the specific instance of the specific object in the query image.

2. The method of claim 1, wherein the geometric shape is a non-right triangle.

3. The method of claim 2, wherein the geometric shape is an equilateral triangle, wherein each feature in the feature triplet is a vertex of the equilateral triangle.

4. The method of claim 1, further comprising finding feature descriptors for each of the features in the feature triplet such that each feature's scale, rotation, and skew are described.

5. The method of claim 4, further comprising:
    assigning a symbol to each feature descriptor, and
    using a triplet inverse lookup table to match the feature triplet with a feature triplet corresponding to a training image.

6. The method of claim 5, further comprising assigning a combination of three indices to the feature triplet and using the combination to match features using the triplet inverse lookup table.

7. The method of claim 5, further comprising verifying the matching of the features using geometric hashing.

8. The method of claim 5, further comprising:
    computing a second affine transformation between the query image and the training image using feature positions in the feature triplet and the training image feature triplet;
    projecting a center of the object on the query image; and
    designating the object as identified if enough triplets agree on the center of the object.

9. The method of claim 8, further comprising projecting reference points of the feature positions onto a single point, wherein the object is a planar object.

10. The method of claim 8, further comprising projecting reference points of the feature position onto a single line, wherein the object is a non-planar object.

11. A computer-implemented process for recognizing an instance of an object in a query image, comprising:
    finding features in the query image to obtain found features;
    grouping the found features into features triplets;
    computing an affine transformation with skew using neighboring feature positions to warp each of the feature triplets into canonical space to form an equilateral triangle;
    matching the feature triplets with feature triplets in a training image; and
    displaying to a user a list of training images that match the query image.

12. The computer-implemented process as set forth in claim 11, further comprising:
    defining a region of an image as a footprint of a feature; and
    using a group of three footprints of each of the three features in the feature triplet to compute feature descriptors the feature triplet.

13. The computer-implemented process as set forth in claim 12, wherein warping each of the feature triplets into canonical space further comprises:
    using an affine transformation to warp the footprints of the feature triplets into canonical space to form the equilateral triangle; and
    using the affine transformation to warp the warped footprints in canonical space back into an original frame.

14. The computer-implemented process as set forth in claim 11, further comprising:
    clustering the feature triplets into clusters; and
    assigning an index symbol to each of the found features, wherein the index indicates which of the clusters a feature belongs.

15. The computer-implemented process as set forth in claim 11, further comprising:
    defining a feature triplet combination for each of the feature triplets;
    generating in inverse lookup table such that each entry contains a feature triplet combination having three indices; and
    finding potential matches between the feature triplets and the feature triplets in the training image.

16. The computer-implemented process as set forth in claim 15, further comprising verifying the potential matches using geometric hashing to compute the affine transformation between each pair of potential matches.

17. A computer-readable storage medium having stored thereon computer-executable instructions for recognizing an instance of an object in a query image, comprising:
    finding features in the query image;
    grouping each of the features into all possible combinations of feature triplets, such that each feature triplet contains three features;
    computing feature descriptors for each of the feature triplets;
    computing a footprint for each of the features using positions of two neighboring features in feature triplets; and
    using an affine transformation with skew to warp the footprints of each feature triplet into canonical space, such that three footprints of the feature triplet form an equilateral triangle.

18. The computer-readable storage medium of claim 17, further comprising:
  clustering the feature triplets into bins, such that each bin is a representative feature and each bin has an index represented by a number; and
  assigning a feature combination to each feature triplet, such that each feature combination contains three indices corresponding to a bin index.

19. The computer-readable storage medium of claim 18, further comprising determining potential matches between feature triplets in the query image and feature triplets in training images using an inverse lookup table, wherein the inverse lookup table contains a feature combination of three indices in each entry.

20. The computer-readable storage medium of claim 19, further comprising:
  obtaining reference points in training images;
  projecting the reference points into the query image using the affine transformation; and
  verifying that a potential match is match if one of the following occurs: (a) for planar objects, the reference points project to a single point in the query image; (b) for non-planar objects, the reference points project on a line in the query image.

\* \* \* \* \*

UNITED STATES PATENT AND TRADEMARK OFFICE
CERTIFICATE OF CORRECTION

PATENT NO. : 7,412,427 B2
APPLICATION NO. : 11/342218
DATED : August 12, 2008
INVENTOR(S) : Charles L. Zitnick et al.

It is certified that error appears in the above-identified patent and that said Letters Patent is hereby corrected as shown below:

In column 21, line 49, in Claim 5, delete "descriptor," and insert -- descriptor: --, therefor.

Signed and Sealed this
Third Day of May, 2011

David J. Kappos
*Director of the United States Patent and Trademark Office*